United States Patent
Knoll et al.

(10) Patent No.: US 9,365,715 B2
(45) Date of Patent: Jun. 14, 2016

(54) THERMOPLASTIC ELASTOMER COMPOSITION AND METHOD FOR THE PRODUCTION THEREOF

(75) Inventors: Konrad Knoll, Mannheim, DE (US); Boris Breitscheidel, Waldsee (DE); Ulrik Stengel, Nieder Liebersbach (DE)

(73) Assignee: STYROLUTION EUROPE GMBH (DE)

( * ) Notice: Subject to any disclaimer, the term of this patent is extended or adjusted under 35 U.S.C. 154(b) by 243 days.

(21) Appl. No.: 13/993,290

(22) PCT Filed: Dec. 20, 2011

(86) PCT No.: PCT/EP2011/073358
§ 371 (c)(1),
(2), (4) Date: Sep. 25, 2013

(87) PCT Pub. No.: WO2012/084914
PCT Pub. Date: Jun. 28, 2012

(65) Prior Publication Data
US 2014/0011929 A1    Jan. 9, 2014

(30) Foreign Application Priority Data

Dec. 23, 2010 (EP) .................................. 10196771

(51) Int. Cl.
*C08L 53/02* (2006.01)
*C08F 297/04* (2006.01)
*C08L 9/06* (2006.01)

(52) U.S. Cl.
CPC .............. *C08L 53/02* (2013.01); *C08F 297/04* (2013.01); *C08L 9/06* (2013.01); *C08L 53/025* (2013.01)

(58) Field of Classification Search
CPC .................................................. C08L 53/02
USPC ............................ 524/505, 300; 264/328.17
See application file for complete search history.

(56) References Cited

U.S. PATENT DOCUMENTS

| | | | |
|---|---|---|---|
| 2,921,089 A | 1/1960 | Hagemeyer, Jr. et al. | |
| 3,418,351 A | 12/1968 | Greene et al. | |
| 3,475,563 A | 10/1969 | Papst | |
| 3,929,898 A | 12/1975 | Nienburg et al. | |
| 3,932,523 A | 1/1976 | Strohmeyer et al. | |
| 4,009,124 A | 2/1977 | Laurer et al. | |
| 4,148,830 A | 4/1979 | Pruett et al. | |
| 4,426,524 A | 1/1984 | Plummer | |
| 5,288,918 A | 2/1994 | Maher et al. | |
| 5,434,313 A | 7/1995 | Harrison et al. | |
| 5,696,297 A | 12/1997 | Kneuper et al. | |
| 5,849,972 A | 12/1998 | Vicari et al. | |
| 6,031,053 A | 2/2000 | Knoll et al. | |
| 6,177,517 B1 | 1/2001 | Guentherberg et al. | |
| 6,197,889 B1 | 3/2001 | Knoll et al. | |
| 6,225,507 B1 | 5/2001 | Giessler et al. | |
| 6,284,917 B1 | 9/2001 | Brunner et al. | |
| 6,310,235 B1 | 10/2001 | Gick | |
| 6,310,261 B1 | 10/2001 | Geissler et al. | |
| 6,673,857 B1 * | 1/2004 | Knoll et al. .................... 524/315 |
| 6,723,884 B1 | 4/2004 | Grenacher et al. | |
| 6,740,773 B2 | 5/2004 | Bohnen et al. | |
| 6,765,119 B2 | 7/2004 | Hoffmann et al. | |
| 6,916,950 B2 | 7/2005 | Gubisch et al. | |
| 7,173,138 B2 | 2/2007 | Ahlers et al. | |
| 7,319,161 B2 | 1/2008 | Noe et al. | |
| 7,355,084 B2 | 4/2008 | Bottcher et al. | |
| 7,683,204 B2 | 3/2010 | Bueschken et al. | |
| 8,044,229 B2 | 10/2011 | Maschmeyer et al. | |
| 8,207,375 B2 | 6/2012 | Grass et al. | |
| 2003/0176582 A1 | 9/2003 | Bening et al. | |
| 2007/0078206 A1 | 4/2007 | Clair | |
| 2011/0252993 A1 * | 10/2011 | Dottinger et al. ............. 101/492 |

FOREIGN PATENT DOCUMENTS

| | | |
|---|---|---|
| DE | 1945359 A1 | 9/1966 |
| DE | 1593368 A1 | 7/1970 |
| DE | 2139630 A1 | 2/1973 |
| DE | 2244373 A1 | 4/1974 |
| DE | 2330435 A1 | 1/1975 |
| DE | 2404855 A1 | 8/1975 |
| DE | 2445303 A1 | 4/1976 |
| DE | 2628987 A1 | 1/1978 |
| DE | 3228881 A1 | 2/1984 |
| DE | 19920257 A1 | 11/2000 |

(Continued)

OTHER PUBLICATIONS

PCT International Preliminary Report on Patentability of International Application No. PCT/EP2011/073358, dated Jun. 27, 2013.

(Continued)

*Primary Examiner* — Ling Choi
*Assistant Examiner* — Lanee Reuther
(74) *Attorney, Agent, or Firm* — J.A. Lindeman & Co., PLLC

(57) ABSTRACT

A thermoplastic elastomer composition, containing a) 5 to 99 wt % of a block copolymer, which is constructed of hard blocks (A) made of vinyl aromatic monomers and one or more random soft blocks (B) of non-hydrogenated or hydrogenated block copolymer materials made of dienes and vinyl aromatic monomers, b) 1 to 95 wt % of a plasticizer having a higher polarity than white oil and a lower polarity than dinonyl adipate, c) 0 to 50 wt % of a polyolefin, and d) 0 to 60 wt % of additives, has advantageous properties in regard to processability.

14 Claims, No Drawings

(56) References Cited

FOREIGN PATENT DOCUMENTS

| DE | 102008024214 A1 | 11/2009 |
|---|---|---|
| EP | 0 366 089 A2 | 5/1990 |
| EP | 0 583 228 A2 | 2/1994 |
| EP | 0 623 651 A2 | 11/1994 |
| EP | 0 695 734 A1 | 2/1996 |
| EP | 0 712 892 A1 | 5/1996 |
| EP | 0 845 498 A1 | 6/1998 |
| EP | 0 880 494 B1 | 5/2000 |
| EP | 1 186 593 A2 | 3/2002 |
| EP | 1 266 882 A1 | 12/2002 |
| EP | 1 300 388 A2 | 4/2003 |
| EP | 1 042 273 B1 | 5/2003 |
| EP | 1 047 655 B1 | 5/2003 |
| GB | 1579159 A | 11/1980 |
| WO | 94/17028 A1 | 8/1994 |
| WO | 95/14647 A1 | 6/1995 |
| WO | 95/35335 A1 | 12/1995 |
| WO | 96/20248 A1 | 7/1996 |
| WO | 97/30016 A1 | 8/1997 |
| WO | 97/40079 A1 | 10/1997 |
| WO | 98/12240 A1 | 3/1998 |
| WO | 98/52901 A2 | 11/1998 |
| WO | 99/32427 A1 | 7/1999 |
| WO | 99/36382 A1 | 7/1999 |
| WO | 00/66662 A1 | 11/2000 |
| WO | 01/14297 A1 | 3/2001 |
| WO | 01/87809 A1 | 11/2001 |
| WO | 02/066412 A1 | 8/2002 |
| WO | 02/083695 A1 | 10/2002 |
| WO | 02/100536 A1 | 12/2002 |
| WO | 03/029168 A2 | 4/2003 |
| WO | 03/029181 A1 | 4/2003 |
| WO | 03/029339 A1 | 4/2003 |
| WO | 2004/009526 A1 | 1/2004 |
| WO | 2005/028407 A1 | 3/2005 |

OTHER PUBLICATIONS

PCT International Search Report of International Application No. PCT/EP2011/073358, dated Apr. 23, 2012.

Chauvin et al., "The IFP Dimersol process for the dimerisation of C3 and C4 olefinic cuts," Chem. Ind., pp. 375-378 (1974).

Cornils et al., "Applied Homogeneous Catalysis with Organometallic Compounds," 2nd Edition; vol. 1; pp. 254-259, Wiley-VCH, Weinheim (2002).

Falbe, "New Syntheses with Carbon Monoxide," Springer, Berlin, pp. 162-168 (1980).

Friedlander et al., "Make plasticizer olefins via n-butene dimerization: Selective dimerization of normal butenes produces lowest cost octenes plus C12's and heavier olefins," Hydrocarbon Processing, pp. 31-33 (Feb. 1986).

Kunststoff-Handbuch, Section 5.1.2.1, pp. 965-975 (Hanser Verlag, Munich, 1975).

Kunststoff-Handbuch, Section 5.1.3.3, pp. 1029-1091 (Hanser Verlag, Munich, 1975).

Ullmann's Encyclopedia of Industrial Chemistry, 5th Edition, vol. A 1, p. 293 (VCH Verlagsgesellschaft, Weinheim 1985).

Ullmann's Encyclopedia of Industrial Chemistry, 5th Edition, vol. A 10, pp. 137-140 (VCH Verlagsgesellschaft mbH, Weinheim 1987).

Ullmann's Encyclopedia of Industrial Chemistry, 5th Edition, vol. A 1, pp. 291-292 (VCH Verlagsgesellschaft, Weinheim 1995).

Ullmann's Encyclopedia of Industrial Chemistry, 6th Edition, vol. 26, pp. 512-516 (Wiley-VCH, Weinheim 2003).

* cited by examiner

THERMOPLASTIC ELASTOMER COMPOSITION AND METHOD FOR THE PRODUCTION THEREOF

The invention relates to a thermoplastic elastomer composition, comprising block copolymers comprising hard blocks A of vinylaromatic monomers and one or more random soft blocks B of unhydrogenated or hydrogenated block copolymers formed from dienes and vinylaromatic monomers, and plasticizers having a higher polarity than white oil and a lower polarity than dinonyl adipate, and also to the use of the molding compositions for producing flexible and elastic moldings, and to the moldings produced therefrom.

Thermoplastic elastomer compositions based on hydrogenated or unhydrogenated styrene-butadiene or styrene-isoprene block copolymers (S-TPE) and optionally polyolefins are known from, for example, EP-A 583 228, EP-A 623 651, EP-A 712 892 or EP-A 845 498. Through the choice of the auxiliaries and the proportions of mixing it is possible to adjust within wide ranges the physical properties such as elasticity, hardness, tensile strength or adhesion. Plasticizers employed are typically low-aromatics paraffinic oils, naphthenic oils or oligomeric polybutadienes.

Thermoplastic elastomers (TPE) or elastomer compositions based on block copolymers of styrene and butadiene with one or more random soft blocks B/S are known from WO 1995/35335, WO 1996/20248 and WO 1998/12240. As compared with thermoplastic elastomers having a soft phase comprising a pure butadiene block, they feature better processing properties, better weathering resistance, better thermal melt stability, and better printability and paintability, with coating materials, for example, and can be combined with other styrene polymers in two-component injection molding.

WO 2000/66662 discloses thermoplastic elastomer compositions where the block copolymers a) are synthesized from hard blocks S of vinylaromatic monomers and one or more random soft blocks B/S of dienes and vinylaromatic monomers. These thermoplastic elastomer compositions leave something to be desired in terms of their aging resistance and processing stability if unsaturated vegetable oils such as sunflower oil are used. Moreover, oil mixtures comprising aliphatic esters which are less polar than diisooctyl phthalate and more polar than dinonyl adipate, such as dioctyl adipate, for example, lead to a sharp reduction in the polystyrene hard phase and hence to a lower heat distortion resistance and significant creep propensity. Other esters as well, such as esters of citric acid with relatively short alcohols, which plasticize PVC to particularly good effect, lead to the disadvantageous effect described.

In view of the relatively high polarity of the soft blocks B/S, these block copolymers are of only limited compatibility with white oils, employed typically as plasticizers for conventional S-TPE.

The thermoplastic elastomers or elastomer compositions that are known to date leave something to be desired, either because they are not printable and/or are not compatible with other styrene polymers, or because they combine a lower Shore hardness with low heat distortion resistance and/or problems with odor resistance and aging resistance.

The present invention was based, therefore, as an object on remedying the disadvantages identified above.

Found accordingly have been improved thermoplastic elastomer compositions comprising (or consisting of):
a) 5% to 99% by weight of a block copolymer synthesized from hard blocks A of vinylaromatic monomers and one or more random soft blocks B of unhydrogenated or hydrogenated block copolymers of dienes and vinylaromatic monomers,
b) 1% to 95% by weight of a plasticizer having a higher polarity than white oil and a lower polarity than dinonyl adipate,
c) 0% to 50% by weight of a polyolefin, and
d) 0% to 60% by weight of additives,
the sum of components a) to d) being 100% by weight.

The invention also relates to elastomer compositions, comprising (or consisting of):
a) 10% to 97% by weight of a block copolymer synthesized from hard blocks A of vinylaromatic monomers and one or more random soft blocks B of unhydrogenated or hydrogenated block copolymers of dienes and vinylaromatic monomers,
b) 3% to 90% by weight of a plasticizer having a higher polarity than white oil and a lower polarity than dinonyl adipate,
c) 0% to 50% by weight of a polyolefin, and
d) 0% to 40% by weight of additives,
the sum of components a) to d) being 100% by weight.

The invention also relates to elastomer compositions, comprising (or consisting of):
a) 49% to 94% by weight of a block copolymer synthesized from hard blocks A of vinylaromatic monomers and one or more random soft blocks B of unhydrogenated or hydrogenated block copolymers of dienes and vinylaromatic monomers,
b) 4% to 49% by weight of a plasticizer having a higher polarity than white oil and a lower polarity than dinonyl adipate,
c) 1% to 50% by weight of a polyolefin, and
d) 0% to 40% by weight of additives.

Another subject-matter is a thermoplastic elastomer composition, which comprises
a) 49% to 94% by weight of a block copolymer synthesized from hard blocks A of vinylaromatic monomers and one or more random soft blocks B of unhydrogenated or hydrogenated block copolymers of dienes and vinylaromatic monomers,
b) 4% to 49% by weight of a plasticizer having a higher polarity than white oil and a lower polarity than dinonyl adipate,
c) 1% to 50% by weight of a polyolefin, and
d) 1% to 40% by weight of additives.

The invention also relates to a process for preparing a thermoplastic elastomer composition, wherein block copolymers having a melt flow rate of 2 to 50 g/10 min are introduced continuously into an extruder and then a plasticizer having a higher polarity than white oil and a lower polarity than dinonyl adipate and optionally further components are metered in.

The invention also relates to a process for preparing a thermoplastic elastomer composition, wherein the ratio of length of the extruder to the screw diameter of the extruder screws is 10:1 and 80:1. The invention also relates to a process for producing elastic and flexible moldings, wherein a thermoplastic elastomer composition as described above is used.

The invention also relates to a use of a thermoplastic elastomer composition for producing elastic and flexible moldings.

The invention also relates to a process for producing moldings having rigid and flexible regions, in which process a thermoplastic elastomer composition (as described) is used as flexible component and an impact-modified or unmodified styrene homopolymer or copolymer, a polyester or a polycarbonate is used as rigid component, by two-component injection molding.

Another subject is the use of the thermoplastic elastomer composition for producing moldings having rigid and flexible regions. The invention also relates to moldings having rigid and flexible regions, obtainable by a process according to the description.

The invention also relates to elastic and flexible moldings obtainable by the process as described above.

The invention also relates to toys, parts of toys, such as dolls and doll heads, action figures, teething rings, model making components, in leisure and water sports, on sports and fitness equipment, massage rods and massage attachments, soft-touch applications, such as handles or nonslip finishes, nonslip mats and nonslip feet for machinery and household appliances, as bathtub and shower-tray inserts, in vehicle interiors and trunks, seals, switches, housings with sealing lips, pushbuttons, flexographic printing plates, footwear soles, hoses, profiles, medical articles such as infusion instruments, dialysis units, and respiration masks, hygiene articles such as toothbrushes, cable compositions, insulating compositions, and sheathing compositions, noise prevention elements, bellows, rolls or roll coverings, antilint rolls, carpet backings, floor coverings, more particularly those resembling linoleum, stretch and cling films, stretch covers, rainwear, obtainable by the process as described.

Component a)

The thermoplastic elastomer compositions comprise 5% to 99%, preferably 10% to 97%, more preferably 49% to 94% by weight of a block copolymer which is synthesized from hard blocks A of vinylaromatic monomers and one or more, generally 1 to 20, preferably 1 to 10, more preferably 1 to 5, i.e., 1, 2, 3, 4 or 5, more particularly 1 to 3, i.e., 1, 2 or 3, random soft blocks B of unhydrogenated or hydrogenated block copolymers of dienes and vinylaromatic monomers.

The weight fraction (percent by weight=% by weight) of the hard blocks A is generally 5% to 95%, preferably 10% to 50%, more preferably 20% to 40%, and more particularly 28% to 34%, based on the total block copolymer. The weight fraction of the soft blocks B is generally 5% to 95%, preferably 50% to 90%, more preferably 60% to 80%, and more particularly 66% to 72%, based on the total block copolymers, i.e., on the sum of hard blocks A+soft blocks B.

Suitable vinylaromatic monomers include styrene, α-methylstyrene, vinyltoluene, tert-butyl-styrene, vinylnaphthalene or mixtures thereof, optionally in combination with 1,1-diphenyl-ethylene, preferably styrene both for the hard blocks A and for the random soft blocks B. The vinylaromatic monomers may be different for the hard blocks A and for the soft blocks B; preferably, the vinylaromatic monomers are the same for the hard blocks A and for the soft blocks B. Likewise preferred is the combination of styrene in the soft blocks B and α-methyl-styrene, vinyltoluene, tert-butylstyrene, vinylnaphthalene or mixtures thereof, optionally in combination with 1,1-diphenylethylene, in the hard blocks A. The molar ratio of 1,1-diphenyl-ethylene to the sum of all of the monomers in the hard blocks A is generally 0.01:1 to 1:1, preferably 0.1:1 to 1:1, more preferably 0.3:1 to 1:1, more particularly 0.35:1 to 0.9:1.

The vinylaromatics content of the soft blocks B is generally 10% to 60%, preferably 20% to 50%, more preferably 30% to 45% by weight, based on the diene. The soft block B may be subdivided into a plurality of random sub-blocks with different molecular weights and/or different monomer compositions.

Suitable conjugated dienes include butadiene, isoprene, piperylene, 1-phenylbutadiene, or mixtures thereof, preferably butadiene and isoprene and also a mixture thereof, more preferably butadiene.

The molecular weight of a block A is generally 1000 to 200 000, preferably 5000 to 50 000, more preferably 15 000 to 25 000 [g/mol]. The block copolymer may be composed of blocks A having the same or different molecular weights.

The molecular weight of the soft block B is typically from 2000 to 250 000, preferably from 20 000 to 150 000, more preferably 60 000 to 120 000 [g/mol]. The block copolymer may be composed of blocks B having the same or different molecular weights.

The block copolymers may be used without, but preferably with stabilizers added. The quantitative ratio of stabilizer to the block copolymer is generally 0% to 10%, preferably 0.001% to 5%, more preferably 0.01% to 3%, more particularly 0.05% to 1%, by weight of stabilizer. Examples of suitable stabilizers include sterically hindered phenols such as Irganox® 1010 or Irganox® 1076 (from BASF SE), preferably in combination with Sumilizer® GM or Sumilizer® GS (from Sumitomo Chemical Co., Tokyo), or with α-tocopherol (vitamin E), or with phosphites such as Irgaphos® 168 (from BASF SE) or trisnonylphenyl phosphite.

Suitable thermoplastic elastomers include diblock copolymers, unsymmetric or symmetric triblock copolymers, tetrablock copolymers, pentablock copolymers, multiblock copolymers or starblock copolymers, preferably symmetric triblock copolymers or starblock copolymers with external blocks A and one or more, generally 1 to 10, preferably 1 to 5, i.e., 1, 2, 3, 4 or 5, more preferably 1 to 3, i.e., 1, 2 or 3, more particularly 1 or 2, very preferably 1, block(s) B situated in between them, and also mixtures of the different block copolymers identified above.

The glass transition temperature of the hard block A is generally 25 to 220° C., preferably at least 40° C., i.e., 40 to 200° C., more preferably at least 50° C., i.e., 50 to 180° C. As a result of the random construction of the soft blocks B, the glass transition temperature is generally (−80) to +25° C., preferably (−70) to +5° C., more preferably (−60) to (−15)° C., more particularly (−55) to (−25)° C.

The block copolymers generally have a diene content of not more than 60% by weight and not less than 20% by weight, often 20% to 50%, preferably 30% to 50%, more preferably 33% to 45%, by weight, based on the total block copolymer (i.e., on the sum of all of the monomers employed).

Component b)

The thermoplastic elastomer composition comprises 1% to 95%, preferably 3% to 90%, more preferably 4% to 49%, more particularly 10% to 30% by weight of a plasticizer having a higher polarity than white oil and a lower polarity than dinonyl adipate.

Examples of suitable plasticizers, (also referred to hereinbelow as plasticizing agents), include as aliphatic esters having at least 20 C atoms, in other words in general 20 to 60 C atoms, preferably 25 to 50 C atoms, more preferably 30 to 40 C atoms, and a ratio of aliphatic C atoms to ester groups of >11, often 12 to 30, preferably 14 to 25, more preferably 16 to 20, the aliphatic C atoms being the sum of the carboxylic acid component and the alcohol component. It is possible for there to be one or more ester groups in the molecule, in other words, for example, 1 to 10, such as 1, 2, 3, 4, 5, 6, 7, 8, 9 or 10, preferably 1 to 6 such as 1, 2, 3, 4, 5 or 6, more preferably 1 to 3, such as 1, 2, or 3, more particularly 1 or 2, very preferably 1, and in general either a diol or polyhydric alcohol is combined with a monocarboxylic acid, or a dicarboxylic or oligocarboxylic acid is combined with a monohydric alcohol.

The aliphatic C atoms may be linked linearly, with branching or cyclically. One or more branches, in the form, for instance, of methyl, ethyl, n-propyl, isopropyl, n-butyl, isobutyl, sec-butyl, tert-butyl, n-pentyl, isopentyl, n-hexyl, isohexyl, n-heptyl, isoheptyl, n-octyl, isooctyl, n-decyl, isodecyl, n-dodecyl, isododecyl, cyclopentyl, cyclohexyl, and cyclooctyl, are preferred.

Examples of suitable plasticizers include the following:

diesters of oxalic acid, malonic acid, succinic acid, glutaric acid, adipic acid, pimelic acid, suberic acid, azelaic acid, sebacic acid, undecanedioic acid, dodecanedioic acid, brassylic acid (tridecanedioic acid), tetradecanedioic acid, thapsic acid, hexadecanedioic acid with relatively long-chain unbranched and branched alcohols having up to 20 C atoms. More particularly suitable are didodecyl oxalate, didodecyl malonate, diundecyl succinate, diundecyl glutarate, didecyl adipate, didecyl pimelate, dinonyl suberate, dinonyl azelate, diisododecyl oxalate, diisododecyl malonate, diisoundecyl succinate, diisoundecyl glutarate, diisodecyl adipate, diisodecyl pimelate, diisononyl suberate, diisononyl azelate, ditridecyl oxalate, ditridecyl malonate, didodecyl succinate, didodecyl glutarate, diundecyl adipate, diundecyl pimelate, didecyl suberate, didecyl azelate, diisotridecyl oxalate, diisotridecyl malonate, diisododecyl succinate, diisododecyl glutarate, diisoundecyl adipate, diisoundecyl pimelate, diisodecyl suberate, diisodecyl azelate, ditetradecyl oxalate, ditetradecyl malonate, ditridecyl succinate, ditridecyl glutarate, didodecyl adipate, didodecyl pimelate, diundecyl suberate, diundecyl azelate, diisotetradecyl oxalate, diisotetradecyl malonate, diisotridecyl succinate, diisotridecyl glutarate, diisododecyl adipate, diisododecyl pimelate, diisoundecyl suberate, diisoundecyl azelate, dipentadecyl oxalate, dipentadecyl malonate, ditetradecyl succinate, ditetradecyl glutarate, ditridecyl adipate, ditridecyl pimelate, didodecyl suberate, didodecyl azelate, diisopentadecyl oxalate, diisopentadecyl malonate, diisotetradecyl succinate, diisotetradecyl glutarate, diisotridecyl adipate, diisotridecyl pimelate, diisododecyl suberate, diisododecyl azelate, dihexadecyl oxalate, dihexadecyl malonate, dipentadecyl succinate, dipentadecyl glutarate, ditetradecyl adipate, ditetradecyl pimelate, ditridecyl suberate, ditridecyl azelate, diisohexadecyl oxalate, diisohexadecyl malonate, diisopentadecyl succinate, diisopentadecyl glutarate, diisotetradecyl adipate, diisotetradecyl pimelate, diisotridecyl suberate, diisotridecyl azelate, diheptadecyl oxalate, diheptadecyl malonate, dihexadecyl succinate, dihexadecyl glutarate, dipentadecyl adipate, dipentadecyl pimelate, ditetradecyl suberate, ditetradecyl azelate, diisoheptadecyl oxalate, diisoheptadecyl malonate, diisohexadecyl succinate, diisohexadecyl glutarate, diisopentadecyl adipate, diisopentadecyl pimelate, diisotetradecyl suberate, diisotetradecyl azelate, dioctadecyl oxalate, dioctadecyl malonate, diheptadecyl succinate, diheptadecyl glutarate, dihexadecyl adipate, dihexadecyl pimelate, dipentadecyl suberate, dipentadecyl azelate, diisooctadecyl oxalate, diisooctadecyl malonate, diisoheptadecyl succinate, diisoheptadecyl glutarate, diisohexadecyl adipate, diisohexadecyl pimelate, diisopentadecyl suberate, diisopentadecyl azelate, dieicosanyl oxalate, dieicosanyl malonate, dioctadecyl succinate, dioctadecyl glutarate, diheptadecyl adipate, diheptadecyl pimelate, dihexadecyl suberate, dihexadecyl azelate, diisoeicosanyl oxalate, diisoeicosanyl malonate, diisooctadecyl succinate, diisooctadecyl glutarate, diisoheptadecyl adipate, diisoheptadecyl pimelate, diisohexadecyl suberate, diisohexadecyl azelate, didocosanyl oxalate, didocosanyl malonate, dieicosanyl succinate, dieicosanyl glutarate, dioctadecyl adipate, dioctadecyl pimelate, diheptadecyl suberate, diheptadecyl azelate, diisodocosanyl oxalate, diisodocosanyl malonate, diisoeicosanyl succinate, diisoeicosanyl glutarate, diisooctadecyl adipate, diisooctadecyl pimelate, diisoheptadecyl suberate, diisoheptadecyl azelate, didocosanyl succinate, didocosanyl glutarate, dieicosanyl adipate, dieicosanyl pimelate, dioctadecyl suberate, dioctadecyl azelate, diisodocosanyl succinate, diisodocosanyl glutarate, diisoeicosanyl adipate, diisoeicosanyl pimelate, diisooctadecyl suberate, diisooctadecyl azelate, didocosanyl adipate, didocosanyl pimelate, dieicosanyl suberate, dieicosanyl azelate, diisodocosanyl adipate, diisodocosanyl pimelate, diisoeicosanyl suberate, diisoeicosanyl azelate, didocosanyl suberate, didocosanyl azelate, diisodocosanyl suberate and diisodocosanyl azelate, diesters of cyclic dicarboxylic acids such as cyclopropane-, 1,2- and 1,3-cyclobutane-, 1,2- and 1,3-cyclopentane-, 1,2-, 1,3-, and 1,4-cyclohexane-, and also 2,3-, 2,4-, 2,5-, 3,4-, 2,7-, 2,8-, 2,9-, 2,10-, 3,7-, 3,8-, and 3,9-decalindicarboxylic acid, diesters of alkyl- and alkoxy-substituted cyclic dicarboxylic acids such as methyl-, dimethyl-, trimethyl-, tetramethyl-, ethyl-, diethyl-, triethyl-, tetraethyl-, isopropyl-, diisopropyl-, butyl-, tert-butyl-, di-tert-butyl-, methoxy-, ethoxy-, propoxy-, butoxy-, and tert-butoxycyclohexanedicarboxylic acid, more particularly:

diundecyl cyclopropanedicarboxylate, diisoundecyl cyclopropanedicarboxylate, didodecyl cyclopropanedicarboxylate, diisododecyl cyclopropanedicarboxylate, ditridecyl cyclopropanedicarboxylate, diisotridecyl cyclopropanedicarboxylate, ditetradecyl cyclopropanedicarboxylate, diisotetradecyl cyclopropanedicarboxylate, pentadecyl cyclopropanedicarboxylate, diisopentadecyl cyclopropanedicarboxylate, hexadecyl cyclopropanedicarboxylate, diisohexadecyl cyclopropanedicarboxylate, diheptadecyl cyclopropanedicarboxylate, diisoheptadecyl cyclopropanedicarboxylate, distearyl cyclopropanedicarboxylate, diisostearyl cyclopropanedicarboxylate, dieicosyl cyclopropanedicarboxylate, diisoeicosyl cyclopropanedicarboxylate, docosyl cyclopropanedicarboxylate, diisodocosyl cyclopropanedicarboxylate, didecyl cyclobutanedicarboxylate, diisodecyl cyclobutanedicarboxylate, diundecyl cyclobutanedicarboxylate, diisoundecyl cyclobutanedicarboxylate, didodecyl cyclobutanedicarboxylate, diisododecyl cyclobutanedicarboxylate, ditridecyl cyclobutanedicarboxylate, diisotridecyl cyclobutanedicarboxylate, ditetradecyl cyclobutanedicarboxylate, diisotetradecyl cyclobutanedicarboxylate, dipentadecyl cyclobutanedicarboxylate, diisopentadecyl cyclobutanedicarboxylate, dihexadecyl cyclobutanedicarboxylate, diisohexadecyl cyclobutanedicarboxylate, diheptadecyl cyclobutanedicarboxylate, diisoheptadecyl cyclobutanedicarboxylate, distearyl cyclobutanedicarboxylate, diisostearyl cyclobutanedicarboxylate, dieicosyl cyclobutanedicarboxylate, diisoeicosyl cyclobutanedicarboxylate, didocosyl cyclobutanedicarboxylate, diisodocosyl cyclobutanedicarboxylate, didecyl cyclopentanedicarboxylate, diisodecyl cyclopentanedicarboxylate, diundecyl cyclopentanedicarboxylate, diisoundecyl cyclopentanedicarboxylate, didodecyl cyclopentanedicarboxylate, diisododecyl cyclopentanedicarboxylate, ditridecyl cyclopentanedicarboxylate, diisotridecyl cyclopentanedicarboxylate, ditetradecyl cyclopentanedicarboxylate, diisotetradecyl cyclopentanedicarboxylate, pentadecyl cyclopentanedicarboxylate, diisopentadecyl cyclopentanedicarboxylate, dihexadecyl cyclopentanedicarboxylate, diisohexadecyl cyclopentanedicarboxylate, diheptadecyl cyclopentanedicarboxylate, diisoheptadecyl cyclopentanedicarboxylate, distearyl cyclopentanedicarboxylate, diisostearyl cyclopentanedicarboxylate, dieicosyl cyclopentanedicarboxylate, diisoeicosyl cyclopentanedicarboxylate, didocosyl cyclopentanedicarboxylate, diisodocosyl cyclopentanedicarboxylate, dinonyl cyclohexanedicarboxylate, diisononyl cyclohexanedicarboxylate, didecyl cyclohexanedicarboxylate, diisodecyl cyclohexanedicarboxylate, diundecyl cyclohexanedicarboxylate, diisoundecyl cyclohexanedicarboxylate, didodecyl cyclohexanedicarboxylate, diisododecyl cyclohexanedicarboxylate, ditridecyl cyclohexanedicarboxylate, diisotridecyl cyclohexanedicarboxylate, ditetradecyl cyclohexanedicarboxylate, diisotetradecyl cyclohexanedicarboxylate, dipentadecyl cyclohexanedicarboxylate, diisopentadecyl cyclohexanedicarboxylate, dihexadecyl cyclohexanedicarboxylate, diisohexadecyl cyclohexanedicarboxylate, diheptadecyl cyclohexanedicarboxylate, diisoheptadecyl cyclohexanedicarboxylate, distearyl cyclohexanedicarboxylate, diisostearyl cyclohexanedicarboxylate, dieicosyl cyclohexanedicarboxylate, diisoeicosyl cyclohexanedicarboxylate, didocosyl cyclohexanedicarboxylate, diisodocosyl cyclohexanedicarboxylate, diheptyl decalindicarboxylate, diisoheptyl decalindicarboxylate, dioctyl decalindicarboxylate, diisooctyl decalindicarboxylate, dinonyl decalindicarboxylate, diisononyl decalindicarboxylate, didecyl decalindicarboxylate, diisodecyl decalindicarboxylate, diundecyl decalindicarboxylate, diisoundecyl decalindicarboxylate, didodecyl decalindicarboxylate, diisododecyl decalindicarboxylate, ditridecyl decalindicarboxylate, diisotridecyl decalindicarboxylate, tetradecyl decalindicarboxylate, diisotetradecyl decalindicarboxylate, dipentadecyl decalindicarboxylate, diisopentadecyl decalindicarboxylate, dihexadecyl decalindicarboxylate, diisohexadecyl decalindicarboxylate, diheptadecyl decalindicarboxylate, diisoheptadecyl decalindicarboxylate, distearyl decalindicarboxylate, diisostearyl decalindicarboxylate, dieicosyl decalindicarboxylate, diisoeicosyl decalindicarboxylate, didocosyl decalindicarboxylate, diisodocosyl decalindicarboxylate;

relatively long-chain carboxylic esters, and of unbranched and branched $C_8$ to $C_{20}$ carboxylic acids, of diols such as ethylene glycol, 1,2- and 1,3-propanediol, 1,2-, 1,3-, 1,4-, and 2,3-butanediol, hexanediol, heptanediol, octanediol, nonanediol, decanediol, undecanediol, dodecanediol, and longer-chain diols, and also branched diols such as neopentyl glycol. More particularly suitable are ethylene glycol didodecanoate, ethylene glycol ditridecanoate, ethylene glycol ditetradecanoate, ethylene glycol dipentadecanoate, ethylene glycol dihexadecanoate, ethylene glycol dioctadecanoate, ethylene glycol dieicosanoate, ethylene glycol didocosanoate, propylene glycol didodecanoate, propylene glycol ditridecanoate, propylene glycol ditetradecanoate, propylene glycol dipentadecanoate, propylene glycol dihexadecanoate, propylene glycol dioctadecanoate, propylene glycol dieicosanoate, propylene glycol didocosanoate, butanediol diundecanoate, butanediol didodecanoate, butanediol ditridecanoate, butanediol ditetradecanoate, butanediol dipentadecanoate, butanediol dihexadecanoate, butanediol dioctadecanoate, butanediol dieicosanoate, butanediol didocosanoate, pentanediol diundecanoate, pentanediol didodecanoate, pentanediol ditridecanoate, pentanediol ditetradecanoate, pentanediol dipentadecanoate, pentanediol dihexadecanoate, pentanediol dioctadecanoate, pentanediol dieicosanoate, pentanediol didocosanoate, hexanediol didecanoate, hexanediol diundecanoate, hexanediol didodecanoate, hexanediol ditridecanoate, hexanediol ditetradecanoate, hexanediol dipentadecanoate, hexanediol dihexadecanoate, hexanediol dioctadecanoate, hexanediol dieicosanoate, hexanediol didocosanoate, octanediol didecanoate, octanediol diundecanoate, octanediol didodecanoate, octanedioldtridecanoate, octanediol ditetradecanoate, octanediol dipentadecanoate, octanediol dihexadecanoate, octanediol dioctadecanoate, octanediol dieicosanoate, octanediol didocosanoate, decanediol dinonanoate, decanediol didecanoate, decanediol diundecanoate, decanediol didodecanoate, decanediol ditridecanoate, decanediol ditetradecanoate, decanediol dipentadecanoate, decanediol dihexadecanoate, decanediol dioctadecanoate, decanediol dieicosanoate, decanediol didocosanoate, dodecanediol dioctanoate, dodecanediol dinonanoate, dodecanediol didecanoate, dodecanediol diundecanoate, dodecanediol didodecanoate, dodecanediol ditridecanoate, dodecanediol ditetradecanoate, dodecanediol dipentadecanoate, dodecanediol dihexadecanoate, dodecanediol dioctadecanoate, dodecanediol dieicosanoate, dodecanediol didocosanoate, neopentyl glycol didodecanoate, neopentyl glycol ditridecanoate, neopentyl glycol ditetradecanoate, neopentyl glycol dipentadecanoate, neopentyl glycol dihexadecanoate, neopentyl glycol dioctadecanoate, neopentyl glycol dieicosanoate, and neopentyl glycol didocosanoate, esters of triols such as glycerol, 1,2,3- and 1,2,4-butanetriol, and also trimethylolpropane (2-ethyl-2-(hydroxymethyl)-1,3-propanediol). More particularly these are glycerol tridodecanoate, glycerol tritridecanoate, glycerol tritetradecanoate, glycerol tripentadecanoate, glycerol trihexadecanoate, glycerol trioctadecanoate, glycerol trieicosanoate, glycerol tridocosanoate, trimethylolpropane triundecanoate, trimethylolpropane tridodecanoate, trimethylolpropane tritridecanoate, trimethylolpropane tritetradecanoate, trimethylolpropane tripentadecanoate, trimethylolpropane trihexadecanoate, trimethylolpropane trioctadecanoate, trimethylolpropane trieicosanoate, trimethylolpropane tridocosanoate, butanetriol tridodecanoate, butanetriol tritridecanoate, butanetriol tritetradecanoate, butanetriol tripentadecanoate, butanetriol trihexadecanoate, butanetriol trioctadecanoate, butanetriol trieicosanoate, and butanetriol tridocosanoate, esters of oligoalcohols such as pentaerythritol and of sugar alcohols (alditols) such as, for example, mannitol, isomalt, lactitol, sorbitol (or glucitol), xylitol, gullitol, threitol, erythritol, and arabitol, more particularly pentaerythritol tetradodecanoate, pentaerythritol tetramidecanoate, pentaerythritol tetratetradecanoate, pentaerythritol tetrapentadecanoate, pentaerythritol tetrahexadecanoate, pentaerythritol tetraoctadecanoate, pentaerythritol tetraeicosanoate, and pentaerythritol tetradocosanoate, and also the analogous esters of the alditols such as, for example, sorbitol hexa(dodecanoate), esters of hydroxycarboxylic acids in which the hydroxyl groups are esterified fully with preferably monocarboxylic acids and the carboxyl groups are esterified fully with preferably monoalcohols, examples being hydroxycarboxylic acids such as lactic acid, citric acid, malic acid, tartaric acid, and also sugar-derived acids such as gluconic acid, more particularly acetyl tridodecyl citrate, acetyl triisododecyl citrate, acetyl tritridecyl citrate, acetyl triisotridecyl citrate, acetyl tritetradecyl citrate, acetyl triisotetradecyl citrate, acetyl tripentadecyl citrate, acetyl triisopentadecyl citrate, acetyl trihexadecyl citrate, acetyl triisohexadecyl citrate, acetyl triheptadecyl citrate, acetyl triisoheptadecyl citrate, acetyl trioctadecyl citrate, acetyl triisooctadecyl citrate, acetyl trieicosanyl citrate, acetyl triisoeicosanyl citrate, acetyl tridocosanyl citrate, acetyl triisodocosanyl citrate, n-butyryl tridodecyl citrate, n-butyryl triisododecyl citrate, n-butyryl tritridecyl citrate, n-butyryl triisotridecyl citrate, n-butyryl tritetradecyl citrate, n-butyryl triisotetradecyl citrate, n-butyryl tripentadecyl citrate, n-butyryl triisopentadecyl citrate, n-butyryl trihexadecyl citrate, n-butyryl triisohexadecyl citrate, n-butyryl triheptadecyl citrate, n-butyryl triisoheptadecyl citrate, n-butyryl trioctadecyl citrate, n-butyryl triisooctadecyl citrate, n-butyryl trieicosanyl citrate, n-butyryl triisoeicosanyl citrate, n-butyryl tridocosanyl citrate, n-butyryl triisodocosanyl citrate, n-hexanoyl undecyl citrate, n-hexanoyl isoundecyl citrate, n-hexanoyl dodecyl citrate, n-hexanoyl isododecyl citrate, n-hexanoyl tridecyl citrate, n-hexanoyl isotridecyl citrate, n-hexanoyl tetradecyl citrate, n-hexanoyl isotetradecyl citrate, n-hexanoyl pentadecyl citrate, n-hexanoyl isopentadecyl citrate, n-hexanoyl hexadecyl citrate, n-hexanoyl isohexadecyl citrate, n-hexanoyl heptadecyl citrate, n-hexanoyl isoheptadecyl citrate, n-hexanoyl octadecyl citrate, n-hexanoyl isooctadecyl citrate, n-hexanoyl eicosanyl citrate, n-hexanoyl isoeicosanyl citrate, n-hexanoyl docosanyl citrate, n-hexanoyl isodocosanyl citrate, n-octanoyl undecyl citrate, n-octanoyl isoundecyl citrate, n-octanoyl dodecyl citrate, n-octanoyl isododecyl citrate, n-octanoyl tridecyl citrate, n-octanoyl isotridecyl citrate, n-octanoyl tetradecyl citrate, n-octanoyl isotetradecyl citrate, n-octanoyl pentadecyl citrate, n-octanoyl isopentadecyl citrate, n-octanoyl hexadecyl citrate, n-octanoyl isohexadecyl citrate, n-octanoyl heptadecyl citrate, n-octanoyl isoheptadecyl citrate, n-octanoyl octadecyl citrate, n-octanoyl isooctadecyl citrate, n-octanoyl eicosanyl citrate, n-octanoyl isoeicosanyl citrate, n-octanoyl docosanyl citrate, n-octanoyl isodocosanyl citrate, n-palmityl decyl citrate, n-palmityl isodecyl citrate, n-palmityl undecyl citrate, n-palmityl isoundecyl citrate, n-palmityl dodecyl citrate, n-palmityl isododecyl citrate, n-palmityl tridecyl citrate, n-palmityl isotridecyl citrate, n-palmityl tetradecyl citrate, n-palmityl isotetradecyl citrate, n-palmityl pentadecyl citrate, n-palmityl isopentadecyl citrate, n-palmityl hexadecyl citrate, n-palmityl isohexadecyl citrate, n-palmityl heptadecyl citrate, n-palmityl isoheptadecyl citrate, n-palmityl octadecyl citrate, n-palmityl isooctadecyl citrate, n-palmityl eicosanyl citrate, n-palmityl isoeicosanyl citrate, n-palmityl docosanyl citrate, n-palmityl isodocosanyl citrate, carboxylic acids and esters in which preferably one or more nonadjacent methylene groups (—$CH_2$—) have been replaced by oxygen (—O—), producing ether linkages C—O—C, preferably esters of mono- and diethoxylated and propoxylated alcohols of relatively long chain length, of the kind prepared by base-catalyzed addition of oxirane or propylene oxide onto alcohols and used, for example, as ingredients for nonionic surfactants, such as diethoxylauryl adipate and diethoxylauryl cyclohexanedicarboxylate, and ether diols such as diethylene glycol, dipropylene glycol or isosorbitol as diol component, such as isosorbitol didodecanoate, for example.

In general it is also possible to use mixtures of different esters. Additionally, in an ester based on a dicarboxylic or oligocarboxylic acid, it is possible for different alcohols to be used in the same molecule. Equally, in an ester based on a dialcohol or oligoalcohol, there may be different carboxylic acids used in the same molecule.

The maximum ratio of aliphatic C atoms to ester groups at which the oil still does not exude is dependent on the styrene content of the random styrene-butadiene soft phase and on the oil content. Where, for example, component a) has a soft phase fraction of 68% by weight and a total styrene content of 65%, meaning that the soft phase contains 47.4% of styrene, it is able to accommodate up to 10% of liquid paraffin (medical white oil) that contains no polar group. In the case of an oil content of more than 10%, the presence of one or more ester groups in the molecule otherwise composed of aliphatic C atoms is necessary in order to prevent exudation of oil. At up to 20% oil content, the ratio of aliphatic C atoms to ester groups is preferably around 45, at 30% oil content 32, at 40% oil content 29, and at 50% oil content 26. In the case of the ratios indicated, a combination of minimal glass transition temperature reduction of the hard phase in conjunction with prevention of oil exudation is achieved.

The procedure possesses the advantage that the heat distortion resistance, tensile strength, and creep resistance are largely retained, i.e., that the best physical properties of the finished polymer mixture are achieved.

Another preferred method of plasticizing vinylaromatics-containing soft phases consists in, mixtures of paraffinic or naphthenic white oil with aliphatic esters having at least 20 carbon atoms and a ratio of aliphatic C atoms to ester groups of >11, i.e., 12:1 to 50:1, preferably 12:1 to 20:1, more preferably 12:1 to 16:1, with the aliphatic C atoms of the carboxylic acid component and of the alcohol component being counted together. The ratio of white oil to aliphatic ester is 1:99 to 99:1, preferably 20:80 to 80:20, more preferably 30:70 to 70:30. Suitable paraffinic oils or naphthenic oils include, in particular, white oils which have been purified to medical grade and which have medical approval or approval under food law. Preference is given to white oils having a viscosity of 50 to 100 centistokes (at room temperature).

One system which is particularly preferred on account of economics is represented by, for example, mixtures of diisononyl cyclohexane-1,2-dicarboxylate (commercial name DINCH) with white oil, the mixing ratio of white oil to DINCH with a 20% oil content of the oil/polymer mixture being preferably 70:30, preferably 50:50 for a 30% oil content, preferably 42:58 for a 40% oil content, and preferably 36:64 for a 50% oil content.

In one preferred embodiment, in the compositions of the invention, cyclohexane 1,2-dicarboxylic acid $C_8$ to $C_{10}$ dialkyl esters are used as plasticizers, examples being: di-(2-ethylhexyl)cyclohexane-1,2-dicarboxylate, diisooctyl cyclohexane-1,2-dicarboxylate, diisononyl cyclohexane-1,2-dicarboxylate, di-(2-propylheptyl)cyclohexane-1,2-dicarboxylate or diisodecyl cyclohexane-1,2-dicarboxylate.

It is also possible to use mixtures of these cyclohexane-1,2-dicarboxylic acid di-$C_8$ to $C_{10}$ dialkyl esters in accordance with the invention, or mixed cyclohexane-1,2-dicarboxylic esters prepared from mixtures of $C_8$ to $C_{10}$ alcohols. In the compositions of the invention it is preferred to use diisononyl cyclohexane-1,2-dicarboxylic esters as plasticizers, an example being the commercially available product Hexamoll® DINCH(CAS No. Europe and Asia: 166412-78-8; CAS No. USA: 474919-59-0; from BASF SE).

The stated cyclohexane-1,2-dicarboxylic acid $C_8$ to $C_{10}$ dialkyl esters may be prepared in an economically advantageous manner by hydrogenation of the aromatic ring of the corresponding phthalic esters. Available to the skilled person for this purpose is a series of processes and catalysts, examples being the ring hydrogenation process of WO 99/032427, comprising the ring hydrogenation of phthalates at 50 to 250° C. under a pressure of 20 to 300 bar, using catalysts which comprise at least one metal from transition group VIII of the Periodic Table of the Elements, such as platinum, rhodium, palladium, cobalt, nickel or ruthenium, for example, preferably ruthenium, either alone or together with at least one metal from transition group I or VII of the Periodic Table, such as copper or rhenium, deposited on a mesoporous aluminum oxide support material with bimodal pore distribution, or the ring hydrogenation processes of WO 2002/100536—Use of a ruthenium catalyst on amorphous silicon dioxide as support, EP-A 1266882—Use of a nickel/magnesium oxide on kieselguhr catalyst, WO 2003/029181—Use of a nickel/zinc on silicon dioxide catalyst, WO 2003/029168—Use of a palladium/ZnO on alumina catalyst and of a ruthenium/ZnO on $\alpha\text{-}Al_2O_3$ catalyst, or WO 2004/09526—Use of a ruthenium on titanium dioxide catalyst.

The cis/trans isomer mixtures of the respective cyclohexane-1,2-dicarboxylic esters that are produced in these hydrogenation processes, with different fractions of cis and trans isomers depending on hydrogenation conditions, may be used as plasticizers in the compositions of the invention, with the thermodynamically more stable trans isomer being formed generally to a relatively increased extent at higher hydrogenation temperatures above 120° C., while the kinetically preferred cis isomer is formed to a relatively increased extent at temperatures below 120° C., in general.

The phthalic esters that serve for preparing, via the route of ring hydrogenation, the cyclohexane-1,2-dicarboxylic acid dialkyl esters that can be used in accordance with the invention may be produced in a way which is familiar to the skilled person, in accordance with the processes as elucidated in Ullmann's Encyclopedia of Industrial Chemistry, 6th Edition, Volume 26, pp. 512-516, Wiley-VCH, Weinheim 2003, by reaction of phthalic anhydride with the respective plasticizer alcohols in the presence of a catalyst. For this purpose it is possible to use not only Brønsted acids, preferably sulfuric acid, or amphoteric catalysts, such as tetraisopropyl orthotitanate and/or tetra-n-butyl orthotitanate. The esterification is carried out in general in the temperature range from 120 to 250° C., the alcohol being used in stoichiometric excess relative to the phthalic anhydride, and serving additionally as an entrainer for the removal by azeotropic distillation of the water that is formed in the course of the esterification. When amphoteric esterification catalysts are used, they may be supplied to the esterification reaction together with the alcohol; advantageously, these amphoteric catalysts are not added to the reaction mixture until the temperature is at or above 160° C., in other words after the respective phthalic monoester has formed as a result of the uncatalyzed addition of the alcohol onto the phthalic anhydride—and subsequently the esterification is continued to its end point with an increase in temperature up to temperatures of in general from 200 to 250° C., with azeotropic removal of the water of reaction and recycling of the alcohol, separated from the water, to the esterification reaction, until the conversion of the phthalic anhydride into the diester is virtually complete.

In this way it is possible to minimize catalyst losses through hydrolysis of the titanium alkoxides during the esterification. Following removal of the excess alcohol, generally by means of distillation, the crude phthalic diester is neutralized by means of aqueous bases, preferably alkali metal hydroxides and/or alkaline earth metal hydroxides, and the amphoteric catalysts are hydrolyzed, the solids which precipitate in this procedure are removed by filtration, and the product is subjected to drying and purification, by stripping with superheated steam, for example. Advantageous embodiments of the kind which may be employed for producing the phthalic dialkyl esters that serve to prepare the cyclohexane-1,2-dicarboxylic acid dialkyl esters for use in accordance with the invention are described in, for example, WO 1994/17028, WO 1998/052901, EP-A 1186 593, EP-A 1300 388, DE-A 1945359, and DE-A 2330435.

Alternatively to the method of the ring hydrogenation of the corresponding phthalic dialkyl esters, the cyclohexane-1,2-dicarboxylic acid $C_8$-$C_{10}$ dialkyl esters for use in accordance with the invention may be synthesized via the Diels-Alder route, as for example in accordance with WO 2002/066412, by cyclization of 1,3-butadiene with maleic anhydride at 40 to 250° C. in a Diels-Alder reaction, advantageously in the presence of a radical polymerization inhibitor, phenothiazine for example, to give the cyclohex-4-ene-1,2-dicarboxylic anhydride, followed by the catalytic hydrogenation of the double bond in the cyclohexene ring—by means, for example, of catalysts which comprise metals from transition group VIII of the Periodic Table of the Elements, such as nickel, cobalt, platinum, palladium, rhodium and/or ruthenium, for example, deposited on a support material, such as activated carbon, $Al_2O_3$ or $SiO_2$—, and esterifying the resultant cyclohexane-1,2-dicarboxylic anhydride with the desired plasticizer alcohol, with esterification catalysts that can be used including Brønsted acids, preferably sulfuric acid, or amphoteric catalysts, such as titanium(IV) alkoxides, an example being tetra-n-butyl orthotitanate.

As a $C_8$ to $C_{10}$ alcohol component for preparing the cyclohexane-1,2-dicarboxylic acid $C_8$ to $C_{10}$ dialkyl esters for use in accordance with the invention, both via the route of esterification of phthalic anhydride to give the corresponding phthalic diesters and their hydrogenation, and via the route of the esterification of cyclohexane-1,2-dicarboxylic anhydride, it is possible to make use, for example, of 2-ethylhexanol, isooctanol, isononanol, 2-propylheptanol, and isodecanol. Serving preferably as an alcohol component are 2-ethylhexanol, isononanol, 2-propylheptanol, and isodecanol, more preferably isononanol.

2-Ethylhexanol, which for many years was the plasticizer alcohol produced in the greatest quantities, can be obtained via the aldol condensation of n-butyraldehyde to form 2-ethylhexenal and the subsequent hydrogenation of the latter to give 2-ethylhexanol (see Ullmann's Encyclopedia of Industrial Chemistry; 5th Edition, Volume A 10, pp. 137-140, VCH Verlagsgesellschaft mbH, Weinheim 1987).

The alcohol isooctanol, unlike 2-ethylhexanol, owing to its mode of preparation, is not a unitary chemical compound, but rather an isomer mixture of differently branched $C_8$ alcohols—for example, of 2,3-dimethyl-1-hexanol, 3,5-dimethyl-1-hexanol, 4,5-dimethyl-1-hexanol, 3-methyl-1-heptanol, and 5-methyl-1-heptanol—which may be present in different proportions in the isooctanol depending on the preparation conditions and preparation processes employed.

Isooctanol is typically prepared by the codimerization of propene with butenes, preferably n-butenes, and subsequent hydroformylation of the resultant mixture of heptene isomers. The octanal isomer mixture that is obtained in the hydroformylation can subsequently be hydrogenated to isooctanol in a conventional way.

The codimerization of propene with butenes to form isomeric heptenes may take place advantageously by means of the homogeneously catalyzed Dimersol® process (Chauvin et al; Chem. Ind.; May 1974, pp. 375-378), in which a soluble nickel-phosphine complex in the presence of an ethylaluminum chlorine compound, such as ethylaluminum dichloride, for example, serves as catalyst. Phosphine ligands which can be used for the nickel complex catalyst include, for example, tributylphosphine, triisopropylphosphine, tricyclohexylphosphine and/or tribenzylphosphine. The reaction takes place at temperatures from 0 to 80® C., with the setting, advantageously, of a pressure at which the olefins are in solution in the liquid reaction mixture (Cornils; Hermann: Applied Homogeneous Catalysis with Organometallic Compounds; 2nd Edition; Vol. 1; pp. 254-259, Wiley-VCH, Weinheim 2002).

Alternatively to the Dimersol® process operated with nickel catalysts homogeneously dissolved in the reaction medium, the codimerization of propene with butenes may also be carried out with heterogeneous NiO catalysts deposited on a support, in which case heptene isomer distributions similar to those for the homogeneously catalyzed process are obtained. Catalysts of this kind are used, for example, in the Octol® process (Hydrocarbon Processing, February 1986, pp. 31-33); a highly suitable specific heterogeneous nickel catalyst for olefin dimerization and codimerization is disclosed in WO 1995/14647, for example.

Instead of catalysts based on nickel, it is also possible to use Brønsted-acidic heterogeneous catalysts for the codimerization of propene with butenes, in which case, in general, the heptenes obtained are more highly branched than in the nickel-catalyzed processes. Examples of catalysts suitable for this purpose are solid phosphoric acid catalysts, for example, phosphoric acid-impregnated kieselguhr or diatomaceous earth, of the kind utilized by the PolyGas® process for olefin dimerization or oligomerization (Chitnis et al; Hydrocarbon Engineering 10, No. 6—June 2005). Brønsted-acidic catalysts which are very suitable for the codimerization of propene and butenes to form heptenes are zeolites, which serve for the EMOGAS® process, which is an onward development on the basis of the PolyGas® process.

The resultant heptene isomer mixtures are hydroformylated by known processes, by means of cobalt or rhodium catalysis, preferably by means of cobalt catalysis.

Suitability for the cobalt-catalyzed hydroformylation of the heptene isomer mixtures is possessed, for example, by the industrially established processes elucidated in Falbe, New Syntheses with Carbon Monoxide, Springer, Berlin, 1980, on pages 162-168, such as the Ruhrchemie process, the BASF process, the Kuhlmann process or the Shell process. While the Ruhrchemie, BASF, and Kuhlmann processes operate with non-ligand-modified cobalt carbonyl compounds as catalysts, to give octanal mixtures, the Shell process (DE-A 1593368) uses phosphine or phosphate ligand-modified cobalt carbonyl compounds as catalysts, which on account of their additional high hydrogenation activity lead directly to the octanol mixtures. Advantageous embodiments for implementing the hydroformylation with non-ligand-modified cobalt carbonyl complexes are described in detail in DE-A 2139630, DE-A 2244373, DE-A 2404855, and WO 2001/014297.

For the rhodium-catalyzed hydroformylation of the heptene isomer mixtures it is possible to employ the industrially established low-pressure rhodium hydroformylation process with triphenylphosphine ligand-modified rhodium carbonyl compounds, as is subject matter of U.S. Pat. No. 4,148,830. For the rhodium-catalyzed hydroformylation of long-chain olefins, such as the heptene isomer mixtures obtained by the processes identified above, it is advantageously possible for non-ligand-modified rhodium carbonyl compounds to serve as catalyst, in which case, in contrast to the low-pressure process, it is necessary to set a higher pressure of 80 to 400 bar. The implementation of high-pressure rhodium hydroformylation processes of this kind is described in EP-A 695734, EP-A 880494, and EP-A 1047655, for example.

The isooctanal mixtures obtained by hydroformylation of the heptene isomer mixtures are subjected to conventional catalytic hydrogenation to form isooctanol mixtures. For this purpose it is preferred to use heterogeneous catalysts which as their catalytically active component comprise metals and/or metal oxides from transition groups VI to VIII, and also I, of the Periodic Table of the Elements, more particularly chromium, molybdenum, manganese, rhenium, iron, cobalt, nickel and/or copper, optionally deposited on a support material such as $Al_2O_3$, $SiO_2$ and/or $TiO_2$. Catalysts of this kind are described in DE-A 3228881, DE-A 2628987, and DE-A 2445303, for example. With particular advantage the hydrogenation of the isooctanals is carried out with an excess of hydrogen of 1.5% to 20% above the amount of hydrogen required stoichiometrically for hydrogenation of the isooctanals, at temperatures from 50 to 200° C. and at a hydrogen pressure of 25 to 350 bar, and with addition to the hydrogenation feed, in order to prevent secondary reactions, in accordance with DE-A 2628987, of a small amount of water, advantageously in the form of an aqueous solution of an alkali metal hydroxide or alkali metal carbonate in accordance with the teaching of WO 2001/087809.

Following distillative purification of the hydrogenation discharge, the resultant isooctanol mixture, as described above, can be esterified with phthalic acid or phthalic anhydride to give the diisooctyl phthalate, the starting material for the preparation of the cyclohexane-1,2-dicarboxylic acid diisooctyl ester via the route of hydrogenation of the aromatic ring. Cyclohexane-1,2-dicarboxylic diisononyl esters are prepared in a manner similar to that described in general above for the cyclohexane-1,2-dicarboxylic acid di-$C_8$ to $C_{10}$ alkyl esters, namely by the esterification of cyclohexane-1,2-dicarboxylic anhydride, which is advantageously obtainable via the Diels-Alder synthesis from 1,3-butadiene and maleic anhydride with subsequent hydrogenation of the double bond in the resultant cyclohexenedicarboxylic anhydride, with isononanol, or preferably by the ring hydrogenation of diisononyl phthalates, which are available to the market in large quantities as standard plasticizers for PVC; in this context, the aforementioned ring hydrogenation processes and catalysts may be used.

The isononanol alcohol component needed for the synthesis of these isononyl esters is not a unitary chemical compound but rather is a mixture of differently branched, isomeric $C_9$ alcohols, which may have different degrees of branching according to the nature of their preparation, more particularly including the starting materials used. Generally speaking, the isononanols are prepared by dimerization of butenes to form isooctene mixtures, subsequent hydroformylation of the isooctene mixtures, and hydrogenation of the resultant isononal mixtures to form isononanol mixtures, as elucidated in Ullmann's Encyclopedia of Industrial Chemistry, 5th Edition, Vol. A1, pp. 291-292, VCH Verlagsgesellschaft, Weinheim 1995.

As starting material for preparing the isononanols it is possible to use isobutene, cis- and trans-2-butene and 1-butene, or mixtures of these butane isomers. The dimerization of pure isobutene, which is catalyzed primarily by means of liquid Brønsted acids, examples being sulfuric acid or phosphoric acid, or of solid Brønsted acids, examples being zeolites or phosphoric acid applied to kieselguhr, $SiO_2$ or $Al_2O_3$ as support material, produces predominantly the highly branched 2,4,4-trimethylpentene, also referred to as diisobutylene, which, following hydroformylation and hydrogenation of the aldehyde, yields highly branched isononanols.

The cyclohexane-1,2-dicarboxylic diisononyl esters for use in accordance with the invention, and the phthalic diisononyl esters serving as starting material for their preparation, are prepared preferably from isononanols having a relatively low degree of branching, which impart improved plasticizer properties to the cyclohexane-1,2-dicarboxylic diisononyl ester plasticizer. Isononanol mixtures of this kind with low degrees of branching are prepared from the linear butenes 1-butene, cis- and/or trans-2-butene, which optionally may also contain relatively small amounts of isobutene, via the above-described pathway of butene dimerization, hydroformylation of the isoctene, and hydrogenation of the resultant isononanal mixtures. One preferred raw material is that known as raffinate II, which is obtained from the $C_4$ cut from a cracker, a steam cracker for example, following elimination of allenes, acetylenes and dienes, more particularly 1,3-butadiene, by partial hydrogenation thereof to form linear butenes, or removal thereof by extractive distillation, as for example by means of N-methylpyrrolidone, and subsequent Brønsted acid-catalyzed removal of the isobutene present therein, by reaction thereof with methanol or isobutanol, in accordance with industrially established processes, to form the fuel additive methyl tert-butyl ether (MTBE) or to form isobutyl tert-butyl ether, which is used for obtaining pure isobutene.

Raffinate II, besides 1-butene and cis- and trans-2-butene, also comprises n-butane and isobutane, and residual amounts of up to 5% by weight of isobutene.

The dimerization of the linear butenes or of the butene mixture present in the raffinate II can be carried out by means of the customary, industrially practiced processes, as elucidated above in connection with the generation of isoheptene mixtures, by means, for example, of heterogeneous, Brønsted-acidic catalysts of the kind used in the PolyGas® or EMOGAS® process, by means of the Dimersol® process, using nickel complex catalysts dissolved homogeneously in the reaction medium, or by means of heterogeneous, nickel (II) oxide-containing catalysts by the Octol® process, or by the process of WO 1995/14647. The isooctene mixtures obtained in these cases are subsequently converted into isononanal mixtures by means of rhodium-catalyzed or cobalt-catalyzed hydroformylation, preferably cobalt-catalyzed hydroformylation, in accordance with the processes elucidated above in connection with the preparation of isooctanal mixtures, and these isononanol mixtures are hydrogenated by means, for example, of one of the catalysts identified above, in connection with the preparation of isooctanol, to give the isononanol mixtures suitable for preparing the cyclohexane-1,2-dicarboxylic diisononyl esters for use with preference in accordance with the invention.

The isononanol isomer mixtures prepared in this way can be characterized via their iso index, which may be calculated from the degree of branching of the individual isomeric isononanol components in the isononanol mixture, multiplied by their percentage fraction in the isononanol mixture. For example, n-nonanol with a value of 0, methyloctanols (one branching) with a value of 1, and dimethylheptanols (2 branchings) with a value of 2 make a contribution to the iso index of an isononanol mixture. The higher the linearity, the lower the iso index of the isononanol mixture in question. Accordingly, the iso index of an isononanol mixture may be ascertained by gas-chromatographic separation of the isononanol mixture into its individual isomers with associated quantification of the percentage proportion of these isomers in the isononanol mixture, determined by standard methods of gas-chromatographic analysis. In order to increase the volatility and improve the gas-chromatographic separation of the isomeric nonanols, they are usefully trimethylsilylated prior to gas-chromatographic analysis by means of standard methods, as for example by reaction with N-methyl-N-trimethylsilyltrifluoroacetamide. In order to maximize separation of the individual components on gas-chromatographic analysis, it is preferred to use capillary columns with polydimethylsiloxane as the stationary phase. Such capillary columns are available commercially, and the skilled person need carry out only a few routine experiments in order to select, from the diverse commercial offering, a product which is best suited to this separation task.

The cyclohexane-1,2-dicarboxylic diisononyl esters for use in accordance with the invention are generally esterified using isononanols having an iso index of 0.8 to 2, preferably of 1.0 to 1.8, and more preferably of 1.1 to 1.5, which may be prepared by the processes identified above.

Indicated below merely by way of example are possible compositions of isononanol mixtures. These may serve for the preparation of the cyclohexane-1,2-dicarboxylic diisononyl esters for use in accordance with the invention; it should be noted in this context that the fractions of the individually recited isomers in the isononanol mixture may vary as a function of the composition of the starting material, raffinate II for example, whose composition in terms of butenes may vary for production reasons, and as a function of fluctuations in the production conditions employed, such as the age of the catalysts used and temperature and pressure conditions to be adapted in line with this.

For example, an isononanol mixture prepared by cobalt-catalyzed hydroformylation and subsequent hydrogenation from an isooctene mixture generated using raffinate II as raw material, by means of the catalyst and process of WO 1995/14647, may have the following composition:

1.73 to 3.73%, preferably 1.93 to 3.53%, more preferably 2.23 to 3.23% by weight of 3-ethyl-6-methylhexanol;
0.38 to 1.38%, preferably 0.48 to 1.28%, more preferably 0.58 to 1.18% by weight of 2,6-dimethylheptanol;
2.78 to 4.78%, preferably 2.98 to 4.58%, more preferably 3.28 to 4.28% by weight of 3,5-dimethylheptanol;
6.30 to 16.30%, preferably 7.30 to 15.30%, more preferably 8.30 to 14.30% by weight of 3,6-dimethylheptanol;
5.74 to 11.74%, preferably 6.24 to 11.24%, more preferably 6.74 to 10.74% by weight of 4,6-dimethylheptanol;
1.64 to 3.64%, preferably 1.84 to 3.44%, more preferably 2.14 to 3.14% by weight of 3,4,5-trimethylhexanol;
1.47 to 5.47%, preferably 1.97 to 4.97%, more preferably 2.47 to 4.47% by weight of 3,4,5-trimethylhexanol, 3-methyl-4-ethylhexanol and 3-ethyl-4-methylhexanol;
4.00 to 10.00%, preferably 4.50 to 9.50%, more preferably 5.00 to 9.00% by weight of 3,4-dimethylheptanol;

0.99 to 2.99%, preferably 1.19 to 2.79%, more preferably 1.49 to 2.49% by weight of 4-ethyl-5-methylhexanol and 3-ethylheptanol;

2.45 to 8.45%, preferably 2.95 to 7.95%, more preferably 3.45 to 7.45% by weight of 4,5-dimethylheptanol and 3-methyloctanol;

1.21 to 5.21%, preferably 1.71 to 4.71%, more preferably 2.21 to 4.21% by weight of 4,5-dimethylheptanol;

1.55 to 5.55%, preferably 2.05 to 5.05%, more preferably 2.55 to 4.55% by weight of 5,6-dimethylheptanol;

1.63 to 3.63%, preferably 1.83 to 3.43%, more preferably 2.13 to 3.13% by weight of 4-methyloctanol;

0.98 to 2.98%, preferably 1.18 to 2.78%, more preferably 1.48 to 2.48% by weight of 5-methyloctanol;

0.70 to 2.70%, preferably 0.90 to 2.50%, more preferably 1.20 to 2.20% by weight of 3,6,6-trimethylhexanol;

1.96 to 3.96%, preferably 2.16 to 3.76%, more preferably 2.46 to 3.46% by weight of 7-methyloctanol;

1.24 to 3.24%, preferably 1.44 to 3.04%, more preferably 1.74 to 2.74% by weight of 6-methyloctanol;

0.1 to 3%, preferably 0.2 to 2%, more preferably 0.3 to 1% by weight of n-nonanol;

25 to 35%, preferably 28 to 33%, more preferably 29 to 32% by weight of other alcohols having 9 and 10 carbon atoms; with the proviso that the sum total of the stated components is 100% by weight.

In accordance with the observations above, an isononanol mixture prepared by cobalt-catalyzed hydroformylation and subsequent hydrogenation from an isooctene mixture generated using an ethylene-containing butene mixture as raw material, by means of the PolyGas® or EMOGAS® process, may vary in the range of the compositions below, depending on the raw material composition and on fluctuations in the reaction conditions employed:

6.0 to 16.0%, preferably 7.0 to 15.0%, more preferably 8.0 to 14.0% by weight of n-nonanol;

12.8 to 28.8%, preferably 14.8 to 26.8%, more preferably 15.8 to 25.8% by weight of 6-methyloctanol;

12.5 to 28.8%, preferably 14.5 to 26.5%, more preferably 15.5 to 25.5% by weight of 4-methyloctanol;

3.3 to 7.3%, preferably 3.8 to 6.8%, more preferably 4.3 to 6.3% by weight of 2-methyloctanol;

5.7 to 11.7%, preferably 6.3 to 11.3%, more preferably 6.7 to 10.7% by weight of 3-ethylheptanol;

1.9 to 3.9%, preferably 2.1 to 3.7%, more preferably 2.4 to 3.4% by weight of 2-ethylheptanol;

1.7 to 3.7%, preferably 1.9 to 3.5%, more preferably 2.2 to 3.2% by weight of 2-propylhexanol;

3.2 to 9.2%, preferably 3.7 to 8.7%, more preferably 4.2 to 8.2% by weight of 3,5-dimethylheptanol;

6.0 to 16.0%, preferably 7.0 to 15.0%, more preferably 8.0 to 14.0% by weight of 2,5-dimethylheptanol;

1.8 to 3.8%, preferably 2.0 to 3.6%, more preferably 2.3 to 3.3% by weight of 2,3-dimethylheptanol;

0.6 to 2.6%, preferably 0.8 to 2.4%, more preferably 1.1 to 2.1% by weight of 3-ethyl-4-methylhexanol;

2.0 to 4.0%, preferably 2.2 to 3.8%, more preferably 2.5 to 3.5% by weight of 2-ethyl-4-methylhexanol;

0.5 to 6.5%, preferably 1.5 to 6%, more preferably 1.5 to 5.5% by weight of other alcohols having 9 carbon atoms; with the proviso that the sum total of the stated components is 100% by weight.

Instead of the production of the cyclohexane-1,2-dicarboxylic diisononyl esters via the synthesis routes outlined above, starting from the stated olefinic and/or aromatic raw materials, entailing high capital investment costs, the cyclohexane-1,2-dicarboxylic diisononyl esters for use in accordance with the invention may be prepared advantageously and at relatively low capital investment expenditure through the ring hydrogenation of the phthalic diisononyl esters available commercially under the brand names, for example, Palatinol® N (BASF SE; CAS No. 28553-12-0), Vestinol® 9 (Oxeno Olefinchemie GmbH; CAS No. 28553-12-0) or Jayflex® DINP (Exxon Mobil Chemical; CAS No. 08515-48-0), by means, for example, of catalysts and processes as stated above in connection with the preparation of cyclohexane-1,2-dicarboxylic acid $C_8$ to $C_{10}$ dialkyl esters, advantageously by means of catalysts and processes of EP-B 1042273.

Examples of cyclohexane-1,2-dicarboxylic acid di-$C_{10}$ alkyl esters suitable for the compositions of the invention are diisodecyl cyclohexane-1,2-dicarboxylate and di(2-propylheptyl) cyclohexane-1,2-dicarboxylate.

The cyclohexane-1,2-dicarboxylic diisodecyl ester may be prepared, in analogy to the descriptions above, by means, for example, of the hydrogenation of the aromatic ring of diisodecyl phthalate available commercially as a standard plasticizer (e.g., Jayflex® DIDP from ExxonMobil Chemical; CAS No. 68515-49-1), by the process, for example, of EP-B 1042273, or else through the esterification of cyclohexane-1,2-dicarboxylic anhydride with isodecanol, in accordance with the process, for example, of WO 2003/029339. Esterification catalysts which can be used in these contexts include not only Brønsted acids, such as sulfuric acid, but also amphoteric catalysts, such as tetra-n-butyl orthotitanate.

The isodecanol used for the esterification of the cyclohexane-1,2-dicarboxylic anhydride or for the preparation of phthalic diisodecyl ester by esterification of phthalic anhydride is not a unitary chemical compound but rather a complex mixture of differently branched, isomeric decanols. These products are generally by the nickel- or Brønsted-acid-catalyzed trimerization of propylene, as for example by the above-elucidated PolyGas® process or by the EMOGAS® process, subsequent hydroformylation of the resultant isononene isomer mixture by means of homogeneous rhodium or cobalt carbonyl catalysts, preferably by means of cobalt carbonyl catalysts, and hydrogenation of the resultant isodecanal isomer mixture by means, for example, of the catalysts and processes identified above in connection with the preparation of isooctanol and isononanol, respectively (Ullmann's Encyclopedia of Industrial Chemistry; 5th Edition, Volume A1, p. 293, VCH Verlagsgesellschaft, Weinheim 1985). The isodecanol thus produced is generally highly branched.

The cyclohexane-1,2-dicarboxylic acid di(2-propylheptyl) ester which can be used in accordance with the invention may be an ester of cyclohexane-1,2-dicarboxylic acid with pure 2-propylheptanol or may comprise esters of cyclohexane-1,2-dicarboxylic acid with propylheptanol isomer mixtures, of the kind generally formed in the industrial production of 2-propylheptanol and commonly referred to likewise as 2-propylheptanol.

The cyclohexane-1,2-dicarboxylic acid di(2-propylheptyl) ester may be prepared in analogy to the elucidations above through, for example, the hydrogenation of the aromatic ring of di(2-propylheptyl) phthalate available commercially as a plasticizer, e.g., Palatinol® 10-P (BASF SE; CAS No. 53306-54-0), as for example by the processes identified above in connection with the preparation of cyclohexane-1,2-dicarboxylic acid $C_8$ to $C_{10}$ dialkyl esters, more particularly by the process of EP-B 1042273, or else through the esterification of cyclohexane-1,2-dicarboxylic anhydride with 2-propylheptanol, in accordance, for example, with the processes of WO 2002/066412 or of WO 2003/029339. Esterification catalysts which can be used include not only Brønsted acids, such as sulfuric acid, but also amphoteric catalysts, such as tetra-n-butyl orthotitanate.

Pure 2-propyheptanol can be obtained by aldol condensation of n-valeraldehyde and subsequent hydrogenation of the resultant 2-propylheptenal, in accordance with U.S. Pat. No. 2,921,089, for example. In general, commercially available 2-propylheptanol comprises not only the main 2-propylheptanol component but also, as a result of the preparation procedure, one or more of the 2-propylheptanol isomers 2-propyl-4-methylhexanol, 2-propyl-5-methylhexanol, 2-isopropylheptanol, 2-isopropyl-4-methylhexanol, 2-isopropyl-5-methylhexanol and/or 2-propyl-4,4-dimethylpentanol. The presence of other isomers of 2-propylheptanol in the 2-propylheptanol, such as 2-ethyl-2,4-dimethylhexanol, 2-ethyl-2-methylheptanol and/or 2-ethyl-2,5-dimethylhexanol, for example, is possible; owing to the low rates of formation of the aldehydic precursors of these isomers in the course of the aldol condensation, they are present only in traces, if at all, in the 2-propylheptanol, and play virtually no part with regard to the plasticizer properties of the di(2-propylheptyl)cyclohexane-1,2-dicarboxylate prepared from 2-propylheptanol isomer mixtures of this kind.

For preparing the di(2-propylheptyl)cyclohexane-1,2-dicarboxylate or the di(2-propylheptyl) phthalate that serves as starting material for the preparation of di(2-propylheptyl) cyclohexane-1,2-dicarboxylate, it is preferred to use mixtures of 2-propylheptanol with one or more of the aforementioned propylheptanol isomers. The isomer composition in the 2-propylheptanol compositions suitable for preparing the di(2-propyheptyl)cyclohexane-1,2-dicarboxylate may fluctuate according to the way in which these compositions are prepared and according to the nature of the raw material used, and may fluctuate not only in terms of the amount of individual isomers in these compositions but also in terms of the presence of particular isomers.

As starting material for the preparation of 2-propylheptanol it is possible to utilize various kinds of hydrocarbon sources, examples being 1-butene, 2-butene, raffinate I—an alkane/alkene mixture which is obtained from the $C_4$ cut from a cracker following removal of allenes, acetylenes, and dienes, and which as well as 1- and 2-butene includes considerable amounts of isobutene as well—or raffinate II, which is obtained from raffinate I by removal of isobutene and as olefin components comprises, besides 1- and 2-butene, only small fractions of isobutene. It is of course also possible to use mixtures of raffinate I and raffinate II as raw material for 2-propylheptanol preparation. These olefins or olefin mixtures can be hydroformylated by inherently conventional methods using cobalt or rhodium catalysts, with 1-butene forming a mixture of n- and isovaleraldehyde—the designation isovaleraldehyde denotes the compound 2-methylbutanal—whose n/iso ratio may vary within relatively wide limits according to the catalyst and hydroformylation conditions used.

For example, when using a homogeneous rhodium catalyst modified with triphenylphosphine (Rh/TPP), 1-butene produces n- and isovaleraldehyde in an n/iso ratio of generally 10:1 to 20:1, whereas, when using rhodium hydroformylation catalysts modified with phosphite ligands, in accordance with U.S. Pat. No. 5,288,918 or WO 2005/028407, for example, or with phosphoamidite ligands, in accordance with WO 2002/83695, for example, n-valeraldehyde is produced almost exclusively. Whereas the Rh/TPP catalyst system converts 2-butene only very slowly in the hydroformylation, meaning that the major fraction of the 2-butene can be recovered from the hydroformylation mixture again, the hydroformylation of 2-butene with the aforementioned phosphite-ligand- or phosphoramidite-ligand-modified rhodium catalysts is accomplished to produce primarily n-valeraldehyde. In contrast, isobutene present in the olefinic raw material is hydroformylated, albeit at different rates, by virtually all catalyst systems, to form 3-methylbutanal and to a lesser extent, depending on catalyst, to form pivalaldehyde.

The $C_5$ aldehydes obtained according to starting materials and catalysts used—that is, n-valeraldehyde optionally in a mixture with isovaleraldehyde, 3-methylbutanal and/or pivalaldehyde—may if desired be separated completely or partly into the individual components by distillation, prior to the aldol condensation, and so here again there is a possibility of influencing and controlling the isomer composition of the $C_{10}$ alcohol component of the ester mixtures of the invention.

It is likewise possible to supply the $C_5$ aldehyde mixture as formed in the hydroformylation to the aldol condensation without the prior removal of individual isomers. In the aldol condensation, which may be carried out by means of a basic catalyst, such as an aqueous solution of sodium or potassium hydroxide, in accordance with the processes described in EP-A 366 089, U.S. Pat. No. 4,426,524 or U.S. Pat. No. 5,434,313, for example, the product when using n-valeraldehyde as the sole condensation product is 2-propylheptenal, whereas, when using a mixture of isomeric $C_5$ aldehydes, an isomer mixture is formed which is made up of the products of the homoaldol condensation of identical aldehyde molecules and the crossed aldol condensation of different valeraldehyde isomers.

Through the controlled reaction of individual isomers, the aldol condensation may be controlled in such a way as to form, predominantly or completely, an individual aldol condensation isomer. The aldol condensation products in question may subsequently—typically after preceding, preferably distillative, removal from the reaction mixture and, if desired, distillative purification—be hydrogenated using conventional hydrogenation catalysts, examples being those identified above for the hydrogenation of aldehydes, to give the corresponding alcohols or alcohol mixtures, which then serve as the starting alcohol for the preparation of di(2-propylheptyl) cyclohexane-1,2-dicarboxylate.

As already mentioned above, the di(2-propylheptyl)cyclohexane-1,2-dicarboxylate for use in accordance with the invention may be esterified solely with pure 2-propylheptanol. Generally speaking, however, these esters are prepared using mixtures of 2-propylheptanol with the stated propylheptanol isomers, the amount of 2-propylheptanol in these mixtures being at least 50% by weight, preferably 60 to 98% by weight, and more preferably 80 to 95% by weight, more particularly 85 to 95% by weight.

Suitable mixtures of 2-propylheptanol with the propylheptanol isomers comprise, for example, those made up of 60 to 98% by weight of 2-propylheptanol, 1 to 15% by weight of 2-propyl-4-methylhexanol, and 0.01 to 20% by weight of 2-propyl-5-methylhexanol, and 0.01 to 24% by weight of 2-isopropylheptanol, the sum of the fractions of the individual constituents not exceeding 100% by weight. The fractions of the individual constituents preferably add up to 100% by weight.

Further suitable mixtures of 2-propylheptanol with the propylheptanol isomers comprise, for example, those made up of 75 to 95% by weight of 2-propylheptanol, 2 to 15% by weight of 2-propyl-4-methylhexanol, 1 to 20% by weight of 2-propyl-5-methylhexanol, 0.1 to 4% by weight of 2-isopropylheptanol, 0.1 to 2% by weight of 2-isopropyl-4-methylhexanol, and 0.1 to 2% by weight of 2-isopropyl-5-methylhexanol, the sum of the fractions of the individual constituents not exceeding 100% by weight. The fractions of the individual constituents preferably add up to 100% by weight.

Preferred mixtures of 2-propylheptanol with the propylheptanol isomers comprise those with 85 to 95% by weight of 2-propylheptanol, 5 to 12% by weight of 2-propyl-4-methylhexanol, and 0.1 to 2% by weight of 2-propyl-5-methylhexanol, and 0.01 to 1% by weight of 2-isopropylheptanol, the sum of the fractions of the individual constituents not exceeding 100% by weight. The fractions of the individual constituents preferably add up to 100% by weight.

When the stated 2-propylheptanol isomer mixtures rather than pure 2-propylheptanol are used for preparing the di(2-propylheptyl)cyclohexane-1,2-dicarboxylate for use in accordance with the invention, the isomer composition of the alkyl ester groups of these esters corresponds practically to the composition of the propylheptanol isomer mixtures used for the esterification.

Via the amount of the plasticizer it is possible to adjust hardness and flow rate of the thermoplastic elastomer composition within wide ranges.

Component c)

The thermoplastic elastomer compositions of the invention may be improved through addition of polyolefins, such as polyethylene, polypropylene, polybutylene, polyisobutylene, ethylene-propylene rubbers, ethylene-propylene-diene rubber (EPDM), styrene-butadiene rubber (SBR; the styrene content may be between 1 to 60%, preferably 10 to 50%, more preferably 20 to 40%), natural rubber, preferably metallocene polyolefins such as copolymers of ethylene with butene, pentene, hexene, heptene, octene, nonene, decene, dodecene, and also from preferably branched olefins of higher molecular mass, with a narrow molecular weight distribution, and polyolefins with a high crystallite melting temperature such as isotactic or syndiotactic polypropylene.

Said component c) is used in amounts from 0 to 50%, preferably 1 to 50%, more preferably 5 to 30%, more particularly 10 to 25%, by weight. The media resistance of the elastomer compositions—for example, with respect to oils and solvents—is improved. Through addition of crystalline polyolefins such as unbranched or branched polyethylenes such as HDPE (high density polyethylene), syndiotactic or isotactic polypropylene, preferably isotactic polypropylene, in amounts of 1 to 50%, preferably 5 to 30%, more preferably 10 to 25%, by weight, it is possible to improve the heat distortion resistance and to reduce the compression set. This can be achieved when the melt viscosity of the crystalline polyolefins is significantly lower than that of the block copolymer and when under shearing conditions such as in an extruder, for example, the cristallizable polyolefin is forced into the continuous phase, which after cooling forms a heat distortion resistance, crystalline network.

Particularly suitable are readily flowing polypropylene grades such as, for example, Purell®HM671T, a highly fluid, metallocene-catalyzed polypropylene homopolymer having a melt flow rate (MFR) of 60 g/10 min (230° C./2.16 kg) from Lyondell-Basell, which is recommended for injection molding applications.

Component d)

The thermoplastic elastomer compositions may comprise as component d) additives of all kinds in amounts of 0 to 60%, preferably 0 to 40%, often 1 to 40% by weight, based on the elastomer composition.

Examples of suitable additives include fibrous and powderous fillers and reinforcing agents, stabilizers, light stabilizers, flame retardants, pigments, dyes, processing assistants such as lubricants and mold release agents, preferably inorganic fillers, such as clay, wood flour, cork flour, talc, carbonates, sulfates, oxides in greater or lesser hydration, such as titanium dioxide, Ca silicates and Mg silicates, silicates such as Aerosil, silica gel or kieselguhr, phosphates such as tricalcium phosphate, or carbon black. Particular significance is possessed by the coating of the surface, by powdering or by contact with a preferably aqueous dispersion of the mixtures of the invention, for example, of—for example—granules or finished moldings, more particularly by means of Aerosil, tricalcium phosphate and/or fatty acid amides such as erucamide.

Largely transparent mixtures are achievable through the addition of what are called nanocomposites. These are phyllosilicates such as montmorillonite, which have been impregnated preferably with hydrophobizing agents such as amines or salts with quaternized amines.

The thermoplastic elastomer compositions of the invention may be prepared as follows:

Depending on whether the styrene-butadiene block copolymer has been produced in the form of flakes (as for example by steam stripping of the organic polymerization solvent; preferably in the case of polymers with very low melt flow rate), in the form of compacts, through compression of the aforementioned flakes, or in the form of pellets, by prior extrusion, different production processes for the mixtures are preferred. Flakes and compacts, especially of poorly flowing polymers, are preferably mixed first with the plasticizer of the invention, having a higher polarity than white oil and a lower polarity than dinonyl adipate, and also, if desired, with further oils, preferably in an apparatus which subjects the flakes to little or no shearing. This may be a rotating drum, a paddle mixer or a slow-running compounder. Suitable compounders/mixers are described in, for example, Kunststoff-Handbuch, Hanser Verlag, Munich, 1975, in Section 5.1.2.1, pages 965 to 975.

Depending on the surface nature of the flakes or of the compacts, the oil migrates into the polymer at a different rate, with a larger surface-volume ratio accelerating the incorporation. Mixing is carried out preferably until all of the oil is bound. The contact time may amount to 1 minute to 1 day, preferably 2 minutes to one hour. The temperature is preferably between 20 and 200° C., preferably between 25 and 100° C., more preferably between 30 and 50° C. The polymer/oil mixture is then transferred preferably to a single-screw or twin-screw or multiscrew compounder or extruder (for example, a ZSK from Coperion, formerly Werner&Pfleiderer), a BUSS kneader (Buss AG, Pratteln, Switzerland) or a LIST reactor (List AG, Arisdorf, Switzerland), and the temperature therein is raised by external heating and/or shearing to temperatures of more than 100° C., preferably more than 140° C. Suitable compounders/extruders are described in, for example, Kunststoff-Handbuch, Hanser Verlag, Munich, 1975, in Section 5.1.3.3, pages 1029 to 1091. The compounder may be fed at various points with further polymers and/or fillers. Readily flowing polymers may be melted together with the oil-impregnated flakes or beforehand. Polymers having a low melt flow rate are metered into the melt preferably together with the oil-impregnated flakes or at a later point. Fillers are metered in preferably at the same time as the polymer/oil mixture, or later. Especially when wood flour is being added, an addition as late as possible is recommended, preferably as the final addition, in order to subject the wood to as little thermal loading as possible.

Where the styrene-butadiene block polymer is in the form of pellets with a sufficient melt flow rate, it may be melted alone in an extruder and the oil may be metered in at a later point. Likewise preferred is the simultaneous metering of oil and pellets and of any further polymers and fillers.

The ready-homogenized mixture may then be worked up preferably by underwater pelletizing (hot chopping) or strand pelletizing (cold chopping), or the melt may be processed further in an injection molding machine.

Examples of further suitable continuous or discontinuous mixing elements include roll mills, Branbury kneaders, and similar elements.

A further preferred variant of incorporating the plasticizers of the invention into the styrene-butadiene block polymers is to meter the plasticizer into the polymer solution in the form in which it is present, for example, after the polymerization, then to homogenize the liquids, if desired, in a preferably static mixer, and subsequently to free the product from the solvent. The variant is employed preferably for high molecular mass polymers which without plasticizer are too high in viscosity for melt processing and which after plasticization have a melt viscosity, expressed as the MFR, of preferably 1 to 100 g/10 min (200° C./5 kg), more preferably of 3 to 50, very preferably of 5 to 20 g/10 min.

Working up is accomplished preferably via multistage devolatilization with flash evaporation in the first step, the solution, prior to the evaporation, being heated in a heat exchanger to 150 to 250° C., preferably to 180 to 220° C., under superatmospheric pressure, and let down through a throttle valve preferably against pressures of between 100 mbar and 5 bar, more preferably 500 mbar to 2 bar, with the solvent, preferably cyclohexane or other hydrocarbons suitable, for example, for the anionic polymerization for preparing the styrene-butadiene block copolymers, being very largely evaporated, preferably down to a residual amount of 1 to 20%.

The melt is preferably heated again to temperatures between 150 and 250° C. and let down again, via a pressure-maintenance valve, into a conveying element, preferably a single-screw or twin-screw or multiscrew extruder, preferably against pressures of between 500 mbar and 2 bar. The pressure can be reduced in a plurality of stages via the devolatilization domes of the extruder, down to preferably 1 to 100 mbar, preferably 5 to 20 mbar, with the temperature of the polymer melt being held preferably at between 120 and 280° C., preferably between 160 and 240° C. The melt may then be converted into pellet form by means, for example, of underwater pelletization.

Production and properties of such block copolymers are described in, for example, WO 1995/35335 or WO 1997/40079, or obtainable by anionic polymerization in a nonpolar solvent with addition of a polar cosolvent or of a potassium salt. Polymers of this kind are sold by BASF, for example, under the trade name of Styroflex® 2G 66. Likewise suitable block copolymers are described in US-A 2003/0176582, as "Controlled Distribution Polymers" having a random styrene-butadiene soft phase which exhibits a controlled composition gradient.

The elastomer compositions of the invention can be prepared in a preferred variant, for example, as follows:

Block copolymers such as, for example, Styroflex® 2G 66 (manufacturer BASF), with a melt flow rate (MFR) in the range from 2 to 50 g/10 min (200° C./5 kg), preferably 6 to 20 g/10 min (200° C./5 kg), are metered preferably in the form of pellets, compacts or powder, continuously, via a weighing device such as, for instance, a belt weigher, into the opening of an extruder, preferably of a counterrotating twin-screw extruder, of the kind, for instance, available from Coperion under the ZSK name. Any further polymers, of the kind described as component c), are metered preferably into the same opening. The length-to-screw-diameter ratio of the extruder screws may be between 10 and 80, preferably between 20 and 60, and more preferably between 30 and 50; the screw diameter, depending on desired throughput, may vary within a very wide range, as for example between 10 and 200 mm.

For throughputs of 2 to 10 kg of elastomer composition, for example, suitable screw diameters are between 18 and 35 mm, preferably 25 to 30 mm, which are available from Coperion under the name ZSK 25 or ZSK 30. The metering opening for the block copolymer is located preferably on the drive side, toward the backward seal to the drive. The screws are composed preferably predominantly of helical conveying elements, and preferably there may be one or more nonconveying kneading elements present. A kneading element is preferably located after the metering opening in the conveying direction. The plasticizer oil supply via, preferably, a tightly screwed-in pipe, is arranged preferably after the kneading element, so that the pellet feed opening and oil metering point are separated from one another by the kneading element. This measure prevents the oil from running back into the conveying opening, but is not mandatory. After the oil metering point, in the conveying direction, there are preferably one or more kneading elements arranged, which may be separated by conveying elements. The temperature profile of the screw barrel is preferably set as follows: in the region of the polymer feed, the temperature of the barrel, which may be heated electrically or with hot oil, is preferably between 120 and 200° C., more preferably between 140 and 180° C.

This temperature range is preferably maintained up to the position of the plasticizer oil feed. Subsequent barrel elements are heated to preferably 120 to 160° C. with polymer mixture oil contents of, in particular, more than 15%. The screw speed is preferably in the range from 50 to 250 revolutions per minute, more preferably in the range from 100 to 200 revolutions per minute. The preferably premixed plasticizer oil is conveyed to the extruder usefully from a storage vessel or tank via preferably a gear pump through preferably a metal pipe or hose, and in addition there is preferably a flow meter located in the conveying line for quantity control.

Arranged at the end of the extruder, preferably, is an underwater pelletizer, also called a hot chopper, of the kind available, for example, from Gala. The residence time of the water/pellets mixture is preferably 10 seconds to 60 minutes, more preferably 2 to 15 minutes, in order to lessen the tendency of the pellets to stick. The water/pellets mixture is then separated preferably via a sieve, with the water being preferably circulated and cooled via a heat exchanger. The water preferably comprises an antiblocking agent in order to prevent the individual pellets from sticking to one another, preferably a fatty acid amide dispersion. The circulating water is cooled preferably to temperatures below 40° C., more preferably below 20° C., very preferably below 10° C. The sieved pellets are subsequently blown dry preferably in a stream of air, and are dusted preferably with a further antiblocking agent in powder form, such as tricalcium phosphate or silica, for example. It can then be moved to a silo or packaged into sacks or other packaging means.

The elastomer compositions of the invention are elastic, thermoplastically processable, and readily recyclable by remelting. Owing to the outstanding processing properties and compatibility with styrene-based thermoplastics, such as glass-clear polystyrene (GPPS), high-impact polystyrene (HIPS), styrene-butadiene block copolymers such as Styrolux® from BASF SE or K-Resin® (Phillips), styrene-acrylonitrile polymers (SAN), acrylonitrile-butadiene-styrene polymers (ABS) or polyphenylene ethers (PPE) or GPPS/

PPE mixtures, the elastomer compositions of the invention are appropriate for two-component {2C} injection molding.

The boundary between the hard components and the elastomer compositions of the invention as soft components is transparent, moreover. With 2C injection molding, it is thus possible to produce flexible and rigid parts in one molding procedure. Also suitable as a hard component are polyesters such as polybutylene terephthalate, but also those with other diol components such as 1,3-propanediol, those with adipic acid, sebacic acid, succinic acid, and other aliphatic dibasic acids, including in combination with aromatic dicarboxylic acids, polycarbonate or mixtures thereof, preferably on the basis of bisphenol A.

The elastomer compositions of the invention can be painted and printed effectively even without corona treatment. They are therefore suitable for producing elastic and flexible moldings, such as toys, parts of toys, such as dolls and doll heads, action figures, teething rings, model making components, in leisure and water sports, on sports and fitness equipment, massage rods and massage attachments, soft-touch applications, such as handles or nonslip finishes, nonslip mats and nonslip feet for machinery and household appliances, as bathtub and shower-tray inserts, in vehicle interiors and trunks, seals, switches, housings with sealing lips, push-buttons, flexographic printing plates, footwear soles, hoses, profiles, medical articles such as infusion instruments, dialysis units, and respiration masks, hygiene articles such as toothbrushes, cable compositions, insulating compositions, and sheathing compositions, noise prevention elements, bellows, rolls or roll coverings, antilint rolls, carpet backings, floor coverings, more particularly those resembling linoleum, stretch and cling films, stretch covers, and rainwear.

The examples below and the patent claims illustrate the invention.

Preparation of an inventive diisononyl cyclohexane-1,2-dicarboxylic ester

EXAMPLE 1

Butene Dimerization

The butene dimerization was carried out in an adiabatic reactor consisting of two component reactors (length: 4 m each, diameter: 80 cm each) with intermediate cooling, continuously and at 30 bar. The feedstock used was a raffinate II whose composition was as follows:
Isobutane: 2% by weight
n-Butane: 10% by weight
Isobutene: 2% by weight
But-1-ene: 32% by weight
trans-But-2-ene: 37% by weight
cis-But-2-ene: 7% by weight The catalyst used was a material in accordance with WO 1995/14647, consisting of 50% by weight NiO, 12.5% by weight $TiO_2$, 33.5% by weight $SiO_2$, and 4% by weight $Al_2O_3$, in the form of 5×5 mm tablets. The reaction was carried out with a throughput of 0.375 kg of raffinate II/l of catalyst xh, a $C_4$/raffinate II recycle of 3, an entry temperature of 38° C. in the 1st component reactor, and an entry temperature of 60° C. in the 2nd component reactor. The conversion rate, based on the butenes present in the raffinate II, was 83.1%; the selectivity for the desired octenes was 83.3%. The octene fraction was separated from unreacted raffinate II and from the high boilers by means of fractional distillation of the reactor discharge.

EXAMPLE 2

Hydroformylation and Subsequent Hydrogenation 750 g of the octene mixture prepared in Example 1 were reacted batchwise in an autoclave with 0.13% by weight of dicobalt octacarbonyl $Co_2(CO)_8$ as catalyst with addition of 75 g of water at 185° C. and under a synthesis gas pressure of 280 bar, with an $H_2$ to CO mixing ratio of 60/40, for 5 hours. The amount of synthesis gas consumed, evident from a drop in pressure in the autoclave, was supplemented by further injection. After the autoclave had been let down, the reaction discharge was freed oxidatively from the cobalt catalyst with 10% strength by weight acetic acid, by introduction of air, and the organic product phase was hydrogenated using Raney nickel at 125° C. under a hydrogen pressure of 280 bar for 10 hours. The isononanol fraction was separated from the $C_8$ paraffins and from the high boilers by fractional distillation of the reaction discharge. Following trimethylsilylation by means of N-methyl-N-trimethylsilyl-trifluoroacetamide, a sample of the resultant isononanol mixture was subjected to analysis by gas chromatography. The composition found was as follows:

| Peak sequence (by increasing retention time) | Compound | Number of branchings per molecule | Fraction in the mixture [%] | Iso index |
|---|---|---|---|---|
| 1 | 2-Ethyl-2-methylhexan-1-ol | 2 | 0.36 | 0.0072 |
| 2 | 2-Ethyl-4-methylhexan-1-ol *) | 2 | 1.37 | 0.0275 |
| 3 | 2-Ethyl-4-methylhexan-1-ol *) | 2 | 1.49 | 0.0298 |
| 4 | 2-Propyl-3-methylpentan-1-ol | 2 | 0.62 | 0.0124 |
| 5 | 2-Propylhexan-1-ol | 1 | 2.64 | 0.0264 |
| 6 | 2,5-Dimethylheptan-1-ol | 2 | 10.49 | 0.2098 |
| 7 | 2,3-Dimethylheptan-1-ol | 2 | 2.95 | 0.0590 |
| 8 | 2,3,4-Trimethylhexan-1-ol | 3 | 1.05 | 0.0314 |
| 9 | 2-Ethylheptan-1-ol | 1 | 3.09 | 0.0309 |
| 10 | 3-Ethyl-4-methylhexan-1-ol | 2 | 2.30 | 0.0461 |
| 11 | 3-Ethylheptan-1-ol | 1 | 7.64 | 0.0764 |
| 12 | 2-Methyloctan-1-ol | 1 | 5.22 | 0.0522 |
| 13 | 4,5-Dimethylheptan-1-ol *) | 2 | 3.86 | 0.0773 |
| 14 | 4,5-Dimethylheptan-1-ol *) | 2 | 4.21 | 0.0843 |
| 15 | 4-Methyloctan-1-ol | 1 | 18.67 | 0.1867 |
| 15a | 7-Methyloctan-1-ol | 1 | 0.27 | 0.0027 |
| 16 | 6-Methyloctan-1-ol | 1 | 19.95 | 0.1995 |
| 17 | Nonan-1-ol | 0 | 10.96 | 0.0000 |
| | Total: | | 97.15 | 1.1595 |
| | unknown | 2 | 2.85 | 0.0569 |
| | | | Iso index of the mixture: | 1.2165 |

*) Conformational isomers

EXAMPLE 3

Esterification 865.74 g of the isononanol fraction obtained in Example 2 (20% excess relative to phthalic anhydride) were reacted with 370.30 g of phthalic anhydride and 0.42 g of isopropyl butyl titanate as catalyst in a 2 l autoclave with $N_2$ sparging (10 l/h) with a stirring speed of 500 rpm and a reaction temperature of 230° C. The water of reaction formed was removed continuously from the reaction mixture with the $N_2$ stream. The reaction time was 180 minutes. The excess isononanol was subsequently distilled off under a reduced pressure of 50 mbar. 1000 g of the crude diisononyl phthalate were neutralized with 150 ml of 0.5% strength aqueous sodium hydroxide solution, by stirring at 80° C. for 10 minutes.

A two-phase mixture was formed, with an upper organic phase and a lower aqueous phase (waste liquor with hydrolyzed catalyst). The aqueous phase was separated off and the organic phase was washed with twice 200 ml of $H_2O$. For further purification, the neutralized and washed diisononyl phthalate was evaporated with steam at 180° C. under a reduced pressure of 50 mbar for 2 hours. The purified diisononyl phthalate was then dried for 30 minutes at 150° C./50 mbar by having a stream of $N_2$ (2 l/h) passed through it, after which it was stirred with activated carbon for 5 minutes and filtered off with suction on a suction filter using Supra-Theorit 5 filter aid (temperature 80° C.).

The resulting diisononyl phthalate possesses a density of 0.973 g/cm$^3$, a viscosity of 73.0 mPa*s, a refractive index $n_D^{20}$ of 1.4853, an acid number of 0.03 mg KOH/g, a water content of 0.03%, and a purity by GC of 99.83%.

EXAMPLE 4

Hydrogenation

EXAMPLE 4a

Preparation of the Hydrogenation Catalyst 50 g of a meso-/macroporous aluminum oxide support in the form of 4 mm extrudates, possessing a BET surface area of 238 m$^2$/g and a pore volume of 0.45 ml/g (pore diameter of about 33% of the total pore volume: 50 nm to 10 000 nm; pore diameter of about 67% of the total pore volume: 2 nm to 50 nm), was impregnated with an aqueous ruthenium nitrosylnitrate solution, as follows: 2.51 g of ruthenium nitrosylnitrate solution were divided into two equal portions, which were each diluted with distilled water to a volume of 16 ml (the concentration of the ruthenium nitrosylnitrate solution was 0.8% by weight).

The first portion of the ruthenium nitrosylnitrate solution was applied to the support. The catalyst support thus impregnated was dried at 120° C. for 16 hours. This procedure was followed by the second impregnating step, which was followed in turn by the drying of the catalyst at 120° C. for 16 hours.

The dried catalyst was reduced with hydrogen in a rotary tube furnace at 200° C. for 2 hours and passivated in a 5% air/N2 mixture (heating time: 60 minutes). The completed catalyst had a ruthenium content of 0.5% by weight, calculated as Ru.

EXAMPLE 4b

Hydrogenation

A continuously operated plant consisting of two tube reactors connected in series (main reactor 160 mL, $d_{internal}$=12 mm, l=1400 mm, and secondary reactor 100 mL, $d_{internal}$=12 mm, l=1000 mm) was filled with the catalyst described in the preparation example (main reactor 71.5 g, secondary reactor 45.2 g). The main reactor was operated in trickle mode with circulation (liquid hourly space velocity 12 m/h), the secondary reactor in straight-run liquid-phase mode. The phthalic ester prepared in Example 3 was pumped through the reactor cascade (infeed 66 g/h) with pure hydrogen at an average temperature of 128° C. in the main reactor and 128° C. in the secondary reactor, and under a pressure of 200 bar. The catalyst hourly space velocity in the main reactor was 0.6 kg phthalic ester/$L_{cat.}$×h. Analysis of the reaction discharge by gas chromatography showed that the phthalic ester had undergone >99.9% conversion. Diisononyl cyclohexane-1,2-dicarboxylic ester was obtained with a selectivity of 99.1%. The phthalic ester prepared in Example 3 was detected at 26 ppm in the discharge. Secondary components detected included about 0.9% by weight of low boilers (components having a boiling point lower than that of the cyclohexanedicarboxylic ester). The cyclohexanedicarboxylic ester was obtained as a mixture of the cis and trans isomers in a cis/trans ratio of 92:8.

EXAMPLE 5

Preparation of the Inventive Thermoplastic Elastomer Compositions

A symmetrical S—B/S—S triblock copolymer was prepared in the same way as in Example 2 from WO-A-97/40079, but with different amounts of feedstocks. A 50 liter reactor was charged with 22.8 liters of dried cyclohexane and 1638 grams of dry styrene and initiated at 40° C. with 87.3 mmol of sec-butyllithium (12% by weight in cyclohexane) and 2.36 mmol of potassium tert-amylate (5% by weight in cyclohexane). The temperature rose to 68° C. Following cooling to 50° C., 1250 g of butadiene and simultaneously 1126 g of styrene were added, the temperature rising to 74° C. In the same way, 1250 g of butadiene and 1126 g of styrene were added again, twice each, and, after the end of the polymerization of the random styrene-butadiene soft block, 1638 g of styrene were added again at 70° C.

After the final temperature of 80° C. had been reached, termination took place using 200 mmol of isopropanol, the product was acidified with carbon dioxide/water and stabilized with 0.15% of Sumilizer® GS, 0.25 of Irganox® 1010, and 0.3% of Irgaphos® 168, and the solution was evaporated on a devolatizing extruder (ZSK 25 from Coperion) and pelletized. The number-average molar mass Mn was 136 000 g/mol, the weight-average Mw 163 000 g/mol (GPC, PS calibration). In the DSC, a glass stage was found in each case at between (−25) and (−55)° C. and at between 60 and 100° C. The symmetric S—B/S—S triblock copolymer is able to absorb up to 10% by weight of white oil. By blending white oil with diisononyl cyclohexane-1,2-dicarboxylate (DINCH) in the proportions indicated in Table 1, it is possible to raise the total oil content to more than 50% by weight, without oil exudation being observed. Table 1 shows the stability limit.

TABLE 1

Stability limit of the white oil fraction with different total oil fractions in the thermoplastic elastomer composition

| | Total oil content [% by weight], based on the elastomer composition | | | | |
| --- | --- | --- | --- | --- | --- |
| | 10 | 20 | 30 | 40 | 50 |
| Stability limit for white oil fraction [%] | 100 | 70 | 50 | 42 | 36 |

On a ZSK 25/2 twin-screw extruder, the block copolymer was mixed with a premixed white oil/diisononyl cyclohexane-1,2-dicarboxylate (DINCH) mixture (mixing ratio 33/67). Total oil fraction and properties of the resultant thermoplastic elastomer composition are summarized in Table 2. The white oil used was medical white oil having a viscosity of 70 Centistokes, from Wintershall (WINOG® 70).

The DSC measurements show that the soft phase is plasticized selectively by the oil mixture. The glass transition temperature of the soft phase, Tg (soft), is lowered from about (−40) to (−78)° C. with a 50% oil fraction, whereas the glass transition temperature of the hard phase, Tg (hard), is virtually unaffected, at about 60° C.

The Shore A hardness decreases almost linearly as the oil content goes up. Even with a Shore A hardness in the region of 10, the mechanical values are still at an acceptable level. The elongation at break attains a maximum of 1200% for a total oil content of 40% by weight.

TABLE 2

Properties of the thermoplastic elastomer composition as a function of total oil content of a white oil/diisononyl cyclohexane-1,2-dicarboxylate (DINCH) mixture (mixing ratio 33/67)

| | Total oil content [% by weight] | | | | | | |
|---|---|---|---|---|---|---|---|
| | 0 | 5 | 10 | 20 | 30 | 40 | 50 |
| Glass transition temperature of the soft phase Tg [° C.] | −39 | −44 | −50 | −58 | −65 | −72 | −78 |
| Shore hardness A | 82 | 70 | 64 | 48 | 31 | 17 | 11 |
| Tensile strength [N/mm$^2$] | 27 | 24 | 23 | 19 | 12 | 5 | 3 |
| Elongation at break [%] | 600 | 700 | 800 | 980 | 1150 | 1200 | 1100 |

The invention claimed is:

1. A thermoplastic elastomer composition consisting of:
   a) 5% to 99% by weight of a block copolymer synthesized from hard blocks A of vinylaromatic monomers and one or more random soft blocks B of unhydrogenated or hydrogenated block copolymers of dienes and vinylaromatic monomers,
   b) 4% to 49% by weight of a plasticizer comprising a mixture or paraffinic or naphthenic white oil with cyclohexane-1,2-dicarboxylic acid $C_8$ to $C_{10}$ dialkyl esters in a mixture ratio of 30:70 to 70:30,
   c) 0% to 50% by weight of a polyolefin, and
   d) 0% to 60% by weight of additives,
   the sum of components a) to d) being 100% by weight and the plasticizer having a higher polarity than white oil and a lower polarity than dinonyl adipate.

2. The thermoplastic elastomer composition according to claim 1, consisting of:
   a) 10% to 97% by weight of the block copolymer,
   b) 4% to 49% by weight of the plasticizer,
   c) 0% to 50% by weight of a polyolefin, and
   d) 0% to 40% by weight of additives.

3. The thermoplastic elastomer composition according to claim 1, consisting of:
   a) 49% to 94% by weight of a block copolymer synthesized from hard blocks A of vinylaromatic monomers and one or more random soft blocks B of unhydrogenated or hydrogenated block copolymers of dienes and vinylaromatic monomers,
   b) 4% to 49% by weight of a plasticizer having a higher polarity than white oil and a lower polarity than dinonyl adipate,
   c) 1% to 50% by weight of a polyolefin, and
   d) 0% to 40% by weight of additives.

4. The thermoplastic elastomer composition according to claim 1, consisting of:
   a) 49% to 94% by weight of a block copolymer synthesized from hard blocks A of vinylaromatic monomers and one or more random soft blocks B of unhydrogenated or hydrogenated block copolymers of dienes and vinylaromatic monomers,
   b) 4% to 49% by weight of a plasticizer having a higher polarity than white oil and a lower polarity than dinonyl adipate,
   c) 1% to 50% by weight of a polyolefin, and
   d) 1% to 40% by weight of additives.

5. The thermoplastic elastomer composition according to claim 1, wherein mixtures of diisononyl cyclohexane-1,2-dicarboxylate with white oil are used as plasticizers b).

6. A process for preparing a thermoplastic elastomer composition according to claim 1, wherein block copolymers having a melt flow rate of 2 to 50 g/10 min are introduced continuously into an extruder and then a plasticizer having a higher polarity than white oil and a lower polarity than dinonyl adipate and optionally further components are metered in.

7. The process for preparing a thermoplastic elastomer composition according to claim 6, wherein the ratio of length of the extruder to the screw diameter of the extruder screws is 10:1 and 80:1.

8. A process for producing elastic and flexible moldings, which comprises using a thermoplastic elastomer composition according to claim 1.

9. A molding having rigid and flexible regions, obtainable by the process according to claim 8.

10. An elastic and flexible molding obtainable by the process according to claim 8.

11. Toys, parts of toys, action figures, teething rings, model making components, in leisure and water sports, on sports and fitness equipment, massage rods and massage attachments, soft-touch applications, nonslip finishes, nonslip mats and nonslip feet for machinery and household appliances, as bathtub and shower-tray inserts, in vehicle interiors and trunks, seals, switches, housings with sealing lips, pushbuttons, flexographic printing plates, footwear soles, hoses, profiles, medical articles, hygiene articles, cable compositions, insulating compositions, and sheathing compositions, noise prevention elements, bellows, rolls or roll coverings, antilint rolls, carpet backings, floor coverings, stretch and cling films, stretch covers, rainwear, obtainable by the process according to claim 8.

12. The method of use of a thermoplastic elastomer composition according to claim 1 for producing elastic and flexible moldings.

13. A process for producing moldings having rigid and flexible regions, which comprises using a thermoplastic elastomer composition according to claim 1 as flexible component and an impact-modified or unmodified styrene homopolymer or copolymer, a polyester or a polycarbonate as rigid component, by two-component injection molding.

14. The method of use of a thermoplastic elastomer composition according to claim 1 for producing moldings having rigid and flexible regions.

* * * * *